(12) United States Patent
Castaneda

(10) Patent No.: US 11,380,044 B2
(45) Date of Patent: *Jul. 5, 2022

(54) METHODS AND SYSTEMS FOR VOLUMETRIC RECONSTRUCTION BASED ON A CONFIDENCE FIELD

(71) Applicant: Verizon Patent and Licensing Inc., Basking Ridge, NJ (US)

(72) Inventor: Oliver S. Castaneda, West Henrietta, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/089,329

(22) Filed: Nov. 4, 2020

(65) Prior Publication Data

US 2021/0082173 A1    Mar. 18, 2021

Related U.S. Application Data

(63) Continuation of application No. 16/797,613, filed on Feb. 21, 2020, now Pat. No. 10,861,218, which is a continuation of application No. 16/671,570, filed on Nov. 1, 2019, now Pat. No. 10,607,394, which is a continuation of application No. 15/906,795, filed on Feb. 27, 2018, now Pat. No. 10,510,178.

(51) Int. Cl.
*G06K 9/00* (2022.01)
*G06T 15/08* (2011.01)
*G06T 15/00* (2011.01)
*G06T 15/06* (2011.01)

(52) U.S. Cl.
CPC ............ *G06T 15/08* (2013.01); *G06T 15/005* (2013.01); *G06T 15/06* (2013.01); *G06T 2215/16* (2013.01)

(58) Field of Classification Search
CPC ....... G06T 15/08; G06T 15/005; G06T 15/06; G06T 2215/16
See application file for complete search history.

(56) References Cited

U.S. PATENT DOCUMENTS

| | | |
|---|---|---|
| 2004/0054433 A1 | 3/2004 | Kobbelt |
| 2004/0202990 A1 | 10/2004 | Geiger |
| 2008/0055305 A1 | 3/2008 | Blank et al. |
| 2014/0184749 A1 | 7/2014 | Hilliges et al. |
| 2015/0049915 A1* | 2/2015 | Ciurea ................. H04N 13/243 382/106 |
| 2015/0133784 A1 | 5/2015 | Kapoor et al. |
| 2015/0294036 A1 | 10/2015 | Bonner |
| 2016/0307360 A1 | 10/2016 | Wiemker et al. |
| 2016/0321838 A1 | 11/2016 | Barone |

(Continued)

*Primary Examiner* — Atiba O Fitzpatrick

(57) ABSTRACT

An illustrative computing system is configured to perform volumetric reconstruction based on a confidence field. In one implementation, the computing system accesses color and depth data captured from a plurality of different vantage points for a surface point on a surface of an object. Based on the color and depth data captured from the plurality of different vantage points, the computing system determines a confidence field value associated with the surface point. Based on the confidence field value associated with the surface point, the computing system generates reconstructed color and depth data for a volumetric reconstruction of the surface of the object. Corresponding methods and systems are also disclosed.

20 Claims, 14 Drawing Sheets

(56) References Cited

U.S. PATENT DOCUMENTS

| | | |
|---|---|---|
| 2017/0032569 A1* | 2/2017 | Rondao Alface ....... G06T 7/246 |
| 2017/0237971 A1 | 8/2017 | Pitts |
| 2018/0139436 A1* | 5/2018 | Yücer ................... H04N 13/106 |
| 2018/0225836 A1 | 8/2018 | Joshi et al. |
| 2018/0253894 A1 | 9/2018 | Krishnan et al. |
| 2018/0350134 A1 | 12/2018 | Lodato et al. |
| 2019/0005666 A1 | 1/2019 | Nakagawa et al. |
| 2019/0026943 A1* | 1/2019 | Yan ......................... G06T 7/586 |
| 2020/0137351 A1 | 4/2020 | Bai et al. |
| 2020/0186776 A1* | 6/2020 | Wang ................... H04N 13/106 |
| 2020/0334895 A1* | 10/2020 | Skotheim .................. G06T 5/50 |
| 2021/0209835 A1* | 7/2021 | Fonseka .................... G06T 7/55 |
| 2021/0368206 A1* | 11/2021 | Sugano .................. G06T 15/20 |

\* cited by examiner

METHODS AND SYSTEMS FOR VOLUMETRIC RECONSTRUCTION BASED ON A CONFIDENCE FIELD

RELATED APPLICATIONS

This application is a continuation application of U.S. patent application Ser. No. 16/797,613, filed Feb. 21, 2020, and entitled "Methods and Systems for Volumetric Reconstruction Based on a Confidence Field," which is a continuation of U.S. patent application Ser. No. 16/671,570, filed Nov. 1, 2019 and issued as U.S. Pat. No. 10,607,394 on Mar. 31, 2020, and entitled "Methods and Systems for Volumetric Reconstruction Based on a Confidence Field," which is a continuation of U.S. patent application Ser. No. 15/906,795, filed Feb. 27, 2018 and issued as U.S. Pat. No. 10,510,178 on Dec. 17, 2019, and entitled "Methods and Systems for Volumetric Reconstruction Based on a Confidence Field." These applications are hereby incorporated by reference in their entirety.

BACKGROUND INFORMATION

Virtual reality technology allows users of virtual reality media player devices to be immersed in virtual reality worlds presented by the media player devices. In some examples, such virtual reality worlds may be based on camera-captured real-world scenery. For example, color and depth data representative of real-world objects within real-world capture spaces may be captured, processed, and presented to users to generate virtual reality worlds within which the users may be immersed during a virtual reality experience.

Various challenges may be associated with capturing data representative of real-world objects and processing the data to generate virtual reality worlds that appear realistic and immersive so as to be enjoyable for users to experience. For example, one challenge may be associated with accurately capturing data (e.g., color data, depth data, etc.) representative of the real-world objects as various sources of noise may compromise the integrity of data captured by individual capture devices capturing the data (e.g., video cameras, depth capture devices, etc.). This challenge may be particularly pronounced in applications where real-world data is captured, processed, and distributed for presentation to users in real time.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
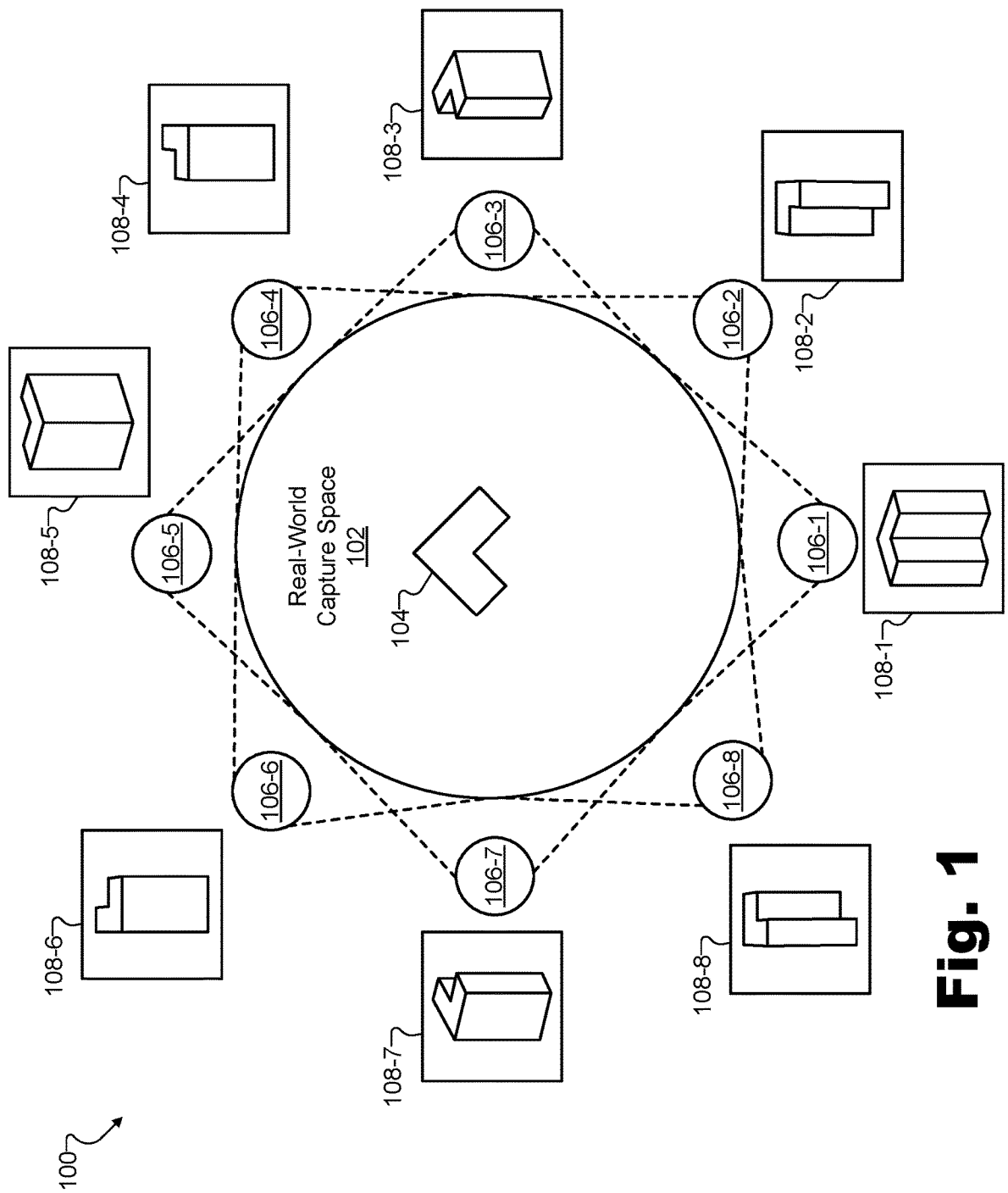
FIG. 1 illustrates an exemplary real-world capture configuration in which data representative of a real-world object within a real-world capture space is captured by a plurality of capture devices positioned with respect to the real-world capture space so as to have different vantage points of the surfaces of the object according to principles described herein.

Methods and systems for volumetric reconstruction based on a confidence field are described herein. For example, as will be described in more detail below, an exemplary implementation of a volumetric reconstruction system may access captured color and depth data for a surface of an object in a real-world capture space. The captured color and depth data may be captured by a plurality of capture devices positioned with respect to the real-world capture space so as to have different vantage points of the surface of the object. Based on the captured color and depth data, the volumetric reconstruction system may generate reconstructed color and depth data for a volumetric reconstruction of the surface of the object. For example, the reconstructed color and depth data for the volumetric reconstruction of the surface of the object may be reconstructed based on a confidence field.

The generating of the reconstructed color and depth data for the volumetric reconstruction of the surface of the object may be performed in any suitable way. For example, the generating may include allocating, within a voxel data store (e.g., a voxel database or other suitable data storage structure), a respective set of voxel nodes corresponding to each surface point in a plurality of surface points on the surface of the object in the real-world capture space. The generating may further include determining and storing a confidence field value within each voxel node in each of the respective sets of voxel nodes allocated within the voxel data store. Each confidence field value may account for various factors such as a distance factor associated with the voxel node and the surface point corresponding to the voxel node, a noise-reduction factor associated with an additional voxel node adjacent to the voxel node, and/or other factors as may serve a particular implementation. The generating may further include determining the reconstructed color and depth data using a raytracing technique. For example, based on the stored confidence field values within the voxel data store, the reconstructed color and depth data may be determined by using the raytracing technique to efficiently traverse the voxel data in the voxel data store to simulate rays of light interacting with the surface of the object.

In some examples, methods and systems for volumetric reconstruction based on a confidence field may be performed in real time so as to allow virtual reality media content based on objects within a real-world capture space to be provided to a user as the data representative of the objects is being captured. As used herein, operations may be performed in "real time" when they are performed immediately and without undue delay such that, for example, data processing operations associated with an ongoing event (e.g., a real-world sporting event, concert, etc.) are performed while the event is still ongoing (e.g., rather than after the fact) even if there is some amount of delay such as a few seconds or minutes. Accordingly, by performing operations (e.g., volumetric reconstruction operations as well as other operations associated with capturing, processing, and distributing virtual reality data) in real time, systems described herein may provide users with virtual reality experiences that are based on live, real-world events. For example, virtual reality users may virtually experience the events at approximately the same time as people actually attending the events in person.

To this end, certain implementations of a volumetric reconstruction system may access, in real time as a plurality of capture devices captures color and depth data for a surface of an object in a real-world capture space, the captured color and depth data for the surface of the object. For example, as described above, the plurality of capture devices may be positioned with respect to the real-world capture space so as to have different vantage points of the surface of the object. The volumetric reconstruction system may further generate reconstructed color and depth data for a volumetric reconstruction of the surface of the object. For example, the generating of the reconstructed color and depth data may be based on the captured color and depth data accessed by the system and may be performed in real time as the plurality of capture devices captures the captured color and depth data.

The generating of the reconstructed color and depth data for the volumetric reconstruction of the surface of the object may be performed in any suitable way. For example, the generating may include allocating voxel nodes within a voxel data store (e.g., a voxel database) implemented within integrated memory of a graphics processing unit ("GPU") included within the volumetric reconstruction system. Specifically, for instance, the GPU may be an NVIDIA GPU that includes GPU Voxel DataBase ("GVDB") technology configured to store and provide efficient access to voxel data representative of voxels in a three-dimensional ("3D") virtual scene. The voxel nodes allocated within the voxel data store may include a respective set of voxel nodes corresponding to each surface point in a plurality of surface points on the surface of the object in the real-world capture space.

As used herein, voxel nodes are referred to as "corresponding" to surface points on surfaces of objects in a real-world capture space. However, it will be understood that there may not be a one-to-one correspondence between voxel nodes (or respective sets of voxel nodes) and surface points. In certain embodiments, voxels are not rendered individually, but, rather, isosurfaces are rendered by interpolating voxel data. As such, an arbitrary number of surface points (e.g., each associated with blended color values) may be derived from the same voxel node or set of voxel nodes when the reconstructed color and depth data is determined for the surface points, based on a relative vantage point associated with the reconstruction (e.g., based on how "zoomed in" the vantage point is in relation to the surface points). As will be described in more detail below, color data may thus be associated with surface points rather than voxel nodes in a final volumetric reconstruction.

The generating may further include determining and storing a confidence field value within each voxel node in each of the respective sets of voxel nodes within the voxel data store. Each of the confidence field values may account for a distance factor associated with the respective voxel node and the respective surface point corresponding to the voxel node. The confidence field values may further account for a noise-reduction factor associated with an additional voxel node that is adjacent to the respective voxel node. The generating may also include determining the reconstructed color and depth data using a raytracing technique and based on the stored confidence field values within the voxel data store, as described above.

As the real-time accessing of the captured color and depth data and the real-time generating of the reconstructed color and depth data are being performed, the volumetric reconstruction system may provide, also in real time, the reconstructed color and depth data to a media player device. For example, the media player device may be a virtual reality media player device configured to render and display virtual reality data for use by a user of the media player device. Accordingly, the volumetric reconstruction system may perform the real-time providing of the reconstructed color and depth data for rendering by the media player device. In this way, the user may experience a high quality, noise free (or noise reduced), immersive virtual reality world based on the volumetric reconstruction of the captured virtual reality data in real time.

Methods and systems described herein for volumetric reconstruction based on confidence fields may provide various benefits and advantages. For example, by volumetrically reconstructing captured data representative of real-world object surfaces to eliminate noise in volumetric representations of the surfaces, methods and systems described herein may help provide realistic, accurate models that may be distributed and/or rendered to create attractive, immersive virtual reality worlds superior in quality to those generated without such volumetric reconstruction methods and systems. As described above, in some examples, these operations may be performed in real time to allow users to experience accurate and realistic representations of objects in the real-world capture space at approximately the same time as someone experiencing the real-world capture space (e.g., a real-world event, etc.) in reality.

Additionally, methods and system described herein may provide certain benefits by generating reconstructed color and depth data for a volumetric reconstruction using a confidence field that takes multiple factors into account, rather than using another type of field or structure that accounts only for distance or density of voxels with respect to the surface of an object. For example, as will be described in more detail below, confidence fields described herein may account not only for a distance factor of voxels with respect to object surfaces, but also may account for a capture device agreement factor (e.g., whether each surface point has been detected by more than one capture device), a noise reduction factor (e.g., accounting for adjacent voxel data by intelligently smoothing data to eliminate sharply contrasting data indicative of noise), and/or other suitable factors. As such, confidence fields may help to reduce noise and generate cleaned-up, accurate representations of objects being volumetrically reconstructed more effectively and efficiently than distance fields or density fields that do not account for such a variety of factors.

Methods and systems for volumetric reconstruction described herein may also provide benefits related to merging data from a plurality of capture sources (e.g., capture devices disposed so as to have different vantage points of a real-world capture space) into a confidence field representation as described below. For example, by merging disparate datasets captured by different capture sources into a single dataset stored in a voxel data store that is readily traversable using raytracing techniques, disclosed methods and systems may generate and provide volumetrically reconstructed representations of real-world objects that are universal and independent from any single capture device. Accordingly, such representations may be efficiently rendered by raytracing from any arbitrary vantage point, rather than from only specific vantage points associated with the positions of particular capture devices capturing the data upon which the representations are based.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary real-world capture configuration 100 ("configuration 100") in which data representative of a real-world object within a real-world capture space is captured by a plurality of capture devices positioned with respect to the real-world capture space so as to have different vantage points of the surfaces of the object. For example, configuration 100 may represent one possible way that the captured color and depth data described above as being accessed by the volumetric reconstruction system is captured.

As shown, a real-world capture space 102 includes a real-world object 104 ("object 104") that is visible from various vantage points around real-world capture space 102. At several of these vantage points, a plurality of capture devices 106 (e.g., capture devices 106-1 through 106-8) are disposed so as to be able to capture data representative of surfaces of object 104 from various angles and viewpoints.

Real-world capture space 102 may be associated with any real-world location, scene, landscape, structure, environment, event, etc., as may serve a particular implementation. For example, real-world capture space 102 may be indoors or outdoors and may be relatively small so as to include a small number of objects (e.g., one object), very large so as to include many objects, or any size in between. As illustrated by the circle, real-world capture space 102 may be implemented, in certain examples, as a specifically delineated area such as a stage, an arena, or the like. Conversely, in other examples, real-world capture space 102 may not be so well defined or delineated but may generally be defined as space that is visible by at least one of capture devices 106 from its respective vantage point.

Object 104 may represent any real-world object, whether living or inanimate, that is associated with (e.g., located within or around) real-world capture space 102 and that is detectable (e.g., viewable, etc.) from a vantage point of at least one of capture devices 106. While object 104 is drawn as a relatively simple geometric shape for the sake of clarity, it will be understood that object 104 may represent various types of objects having various levels of complexity. Rather than a geometric shape, for instance, object 104 could represent any animate or inanimate object or surface, such as a person or another living thing, a non-transparent solid, liquid, or gas, a less discrete object such as a wall, a ceiling, or a floor, or any other type of object described herein or as may serve a particular implementation. As shown, object 104 may include various surfaces such that object 104 may look different when viewed from the different vantage points of each different capture device 106.

Capture devices 106 may be implemented as any suitable devices configured to capture data representative of object 104 and other objects within real-world capture space 102. For example, each capture device 106 may represent a video camera or other visible light detection device for capturing color data representative of objects within real-world capture space 102, a depth detection device (e.g., based on triangulation, time-of-flight, or other suitable depth detection techniques) for capturing depth data representative of the objects, a combination of these for capturing color and depth data for the objects, or any other capture device or devices as may serve a particular implementation. As shown, capture devices 106 may be disposed so as to have different vantage points around real-world capture space 102 and may be pointed inwardly so as to have a view of real-world capture space 102 and object 104 represented by the respective dotted lines emanating from each capture device 106.

Capture devices 106 may be positioned statically with respect to real-world capture space 102, such as by being fixed in place on tripods or the like so that capture devices 106 may be calibrated to all be on a world coordinate system (e.g., a global or universal coordinate system shared by all of capture devices 106) with respect to real-world capture space 102. However, it will be understood that objects within real-world capture space 102 (e.g., object 104) may be in motion as data is captured for the objects and that, in some examples, real-world capture space 102 and all of capture devices 106 may be static with respect to one another while being in motion together relative to other points of reference.

In some examples, capture devices 106 may be integrated with or otherwise included as part of a volumetric reconstruction system. As such, the volumetric reconstruction system may access color and depth data captured by the capture devices 106 by directing the capture devices 106 to capture the data. In other examples, capture devices 106 may be separate from the volumetric reconstruction system (e.g., included in an independent system) such that the captured color and depth data accessed by the volumetric reconstruction system is accessed by being transmitted to the volumetric reconstruction system from capture devices 106 directly or from another system (not explicitly shown in FIG. 1) that is configured to direct operations of capture devices 106, as well as to process, store, and distribute the color and depth data captured by capture devices 106 in any suitable way.

As shown, each capture device 106 may capture a unique dataset 108 (e.g., datasets 108-1 through 108-8 for capture devices 106-1 through 106-8, respectively) from the respective vantage point of the capture device 106. For example, as shown, dataset 108-1 illustrates a view of object 104 from the vantage point of capture device 106-1, which view is different from the view of object 104 captured in dataset 108-2 from the vantage point of capture device 106-2, and so forth. As mentioned above, each capture device 106 may be configured to capture color data (e.g., photographic data, video data, etc.), depth data, or a combination of color and depth data.

Figure 2:
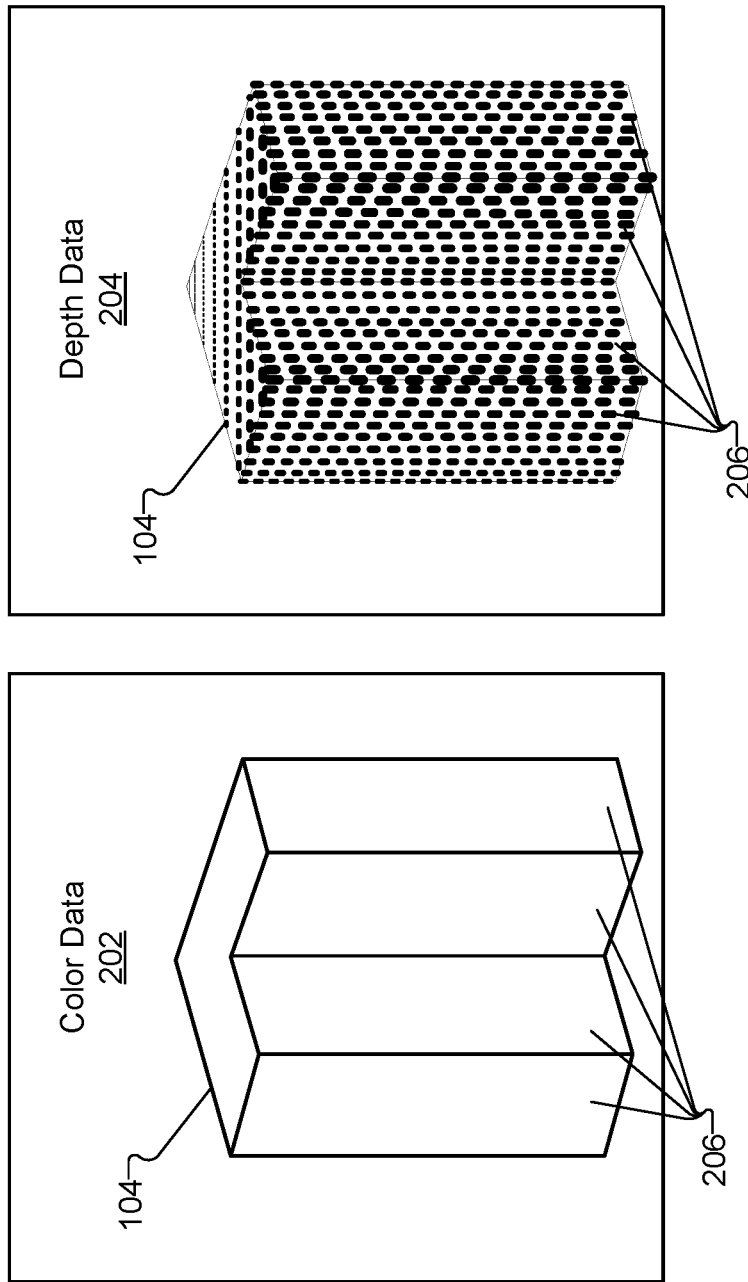
FIG. 2 illustrates exemplary color and depth data captured by a capture device in the plurality of capture devices of FIG. 1 according to principles described herein.

While not explicitly illustrated by datasets 108 in FIG. 1, FIG. 2 illustrates exemplary color and depth data captured by a capture device in the plurality of capture devices 106. Specifically, FIG. 2 illustrates color data 202 and depth data 204 that are included within dataset 108-1 captured by capture device 106-1.

Each dataset 108, including dataset 108-1, may include color data such as illustrated by color data 202 and depth data such as illustrated by depth data 204. For example, as shown, both color data 202 and depth data 204 include different types of representations of object 104 and a plurality of surfaces 206 of object 104 as visible from the vantage point of capture device 106-1. In some examples (e.g., such as examples in which volumetric reconstruction operations are being performed in real time), each dataset 108 may include continuous streams of such color and depth data that are being processed (e.g., in real time). In other examples, each dataset 108 may be a discrete set of data (e.g., a file) that has been captured previously.

As used herein, "color data," such as color data 202, may broadly include any image data, video data, or the like, whether represented in color or grayscale (i.e., "black and white"), that represents how a subject (e.g., a real-world object included within a real-world capture space) may appear at a particular point in time or over a particular time period from the perspective of a particular vantage point. Color data is not limited to any particular format, file type, frame rate, resolution, quality level, or other characteristic that may be associated with various definitions and/or standards defining image data and/or video data in the art.

Similarly, as used herein, "depth data," such as depth data 204, may include any data representative of a position of a subject in space. For example, depth data representative of a real-world object may include coordinates with respect to a world coordinate system for different points on the surfaces of the virtual object, or another representation of where each surface point on surfaces 206 are positioned in space. For example, as shown, each captured pixel making up depth data 204 may be a grayscale value representative of the relative distance of a surface point represented by that pixel where closer surface points are represented with higher values and farther surface points are represented with lower values (or vice versa). In an exemplary 16-bit depth data representation, for instance, a minimum depth data value such as 0x0000 (white) may represent points that are infinitely far away from the capture device vantage point, while a maximum depth data value such as 0xFFFF (black) may represent points that are right at the vantage point. Thus, as illustrated by depth data 204 in FIG. 2, surface points on surfaces 206 that are relatively far away may be represented by pixels of a lighter shade of gray while surface points that are relatively close may be represented by pixels of a darker shade of gray.

The color and depth data from all datasets 108 may be combined to form volumetric representations of real-world objects (e.g., such as object 104), which may then be incorporated into virtual reality data to be distributed to and rendered by media player devices used by users to experience virtual reality worlds based on the real-world objects.

However, as described above, the processes of capturing datasets using different capture devices and merging the datasets when there may not be perfect consistency across the captured datasets may result in inaccurate, noisy, or otherwise deficient representations. Particularly in applications where operations are to be performed in real time, undesirable capture artifacts and other noise may tend to characterize volumetric representations to the detriment of the realism, attractiveness, and immersiveness of the virtual reality experience provided to the user. To this end, systems and methods for volumetric reconstruction based on a confidence field described herein may be employed to remove noise and/or to otherwise improve the color and depth data before providing the color and depth data for presentation by a media player device.

Figure 3:
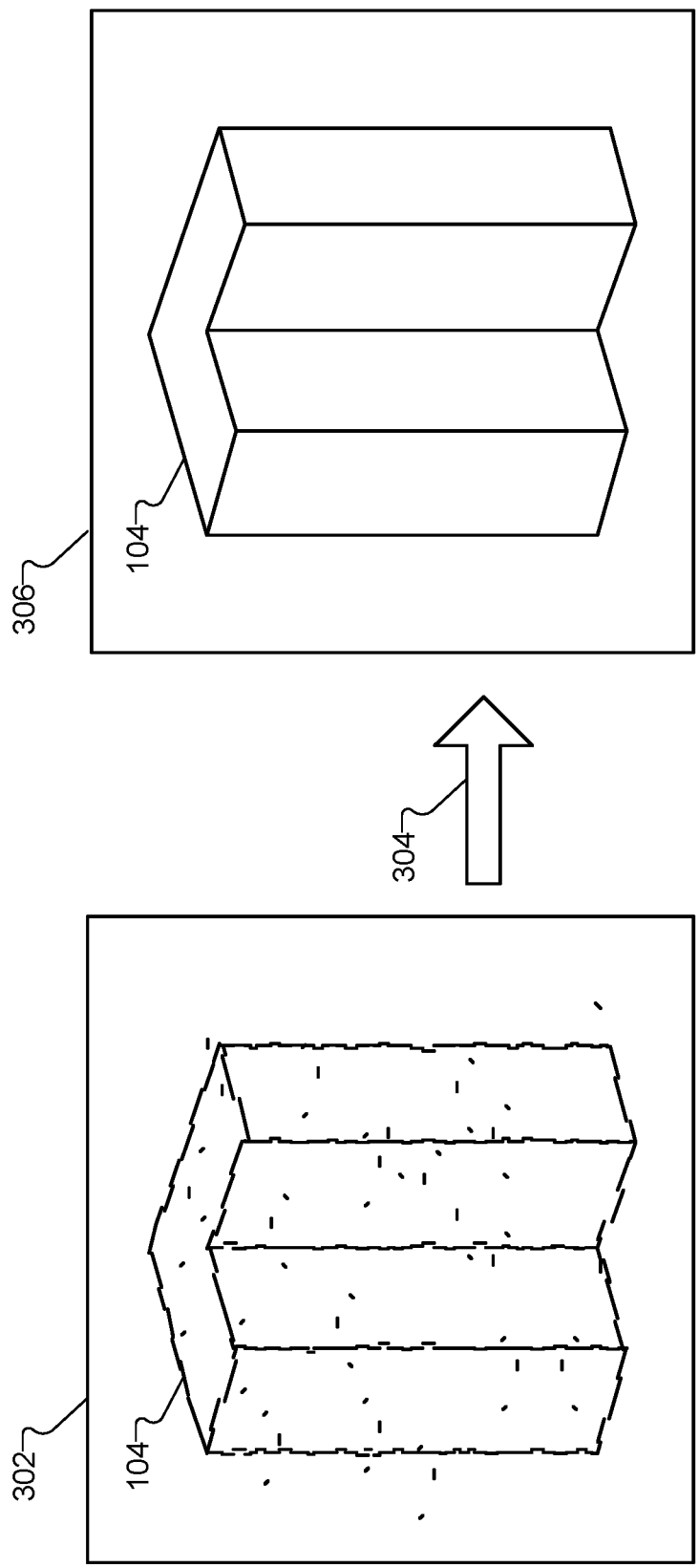
FIG. 3 illustrates an exemplary volumetric reconstruction of a volumetric model of the real-world object of FIG. 1 according to principles described herein.

FIG. 3 illustrates an exemplary volumetric reconstruction of a volumetric model of object 104. Specifically, a representation 302 of data representative of object 104 illustrates how object 104 may be represented in the color and depth data captured by capture devices 106 (e.g., in color and depth data of dataset 108-1). As shown, object 104 may be recognizable in representation 302, but may be associated with noise that may blur the edges and surfaces of the object or otherwise fail to authentically represent object 104 as the object would appear to the user if he or she was viewing the object directly in real-world capture space 102.

Accordingly, a volumetric reconstruction 304 may be performed to generate reconstructed color and depth data that represent a more accurate, true, noise-free representation of object 104. This representation is illustrated in FIG. 3 as representation 306. As shown, representation 306 of object 104 may appear significantly more attractive and accurate than representation 302, thereby providing various benefits to the user when used within virtual reality data in place of representation 302. For example, as described above, the user may more easily become immersed in a virtual reality experience employing accurate representations of objects such as representation 306, and may enjoy such virtual reality experiences more than virtual reality experiences characterized by lower quality.

Volumetric reconstruction 304 may be performed in any manner as may serve a particular implementation. For example, as will be described in more detail below, each surface point on each surface of object 104 may be associated with a plurality of voxel nodes allocated within a voxel data store. Values to be stored within each allocated voxel node in the voxel data store may be generated based on color and depth data captured by a plurality of capture devices. For example, the values may be derived from all of datasets 108 captured by capture devices 106. In this way, a representation of object surfaces stored in the voxel data store may include information for various surfaces of the object that are visible from different angles and/or vantage points.

Methods and techniques for merging depth data from the captured datasets (e.g., datasets 108) will be described in more detail below. For example, the allocated voxel nodes may each store a confidence field value representative of a confidence field that is generated to model the surfaces of object 104 and that accounts for various factors as will be described below.

Additionally, once depth data has been accounted for in a volumetrically reconstructed representation stored in a voxel data store, color data may also be added to the representation. For example, the generating of the reconstructed color and depth data for the volumetric reconstruction of the surface of the object may include determining and storing a color value within each voxel node within the voxel data store (e.g., within all of the voxel nodes in a plurality of respective sets of voxel nodes corresponding to a plurality of surface points on the surfaces being modeled). The color values may be determined in any suitable manner. For example, a basic color associated with each surface point may be stored in the corresponding set of voxel nodes for that surface point to be used as a backup during reconstruction.

Additionally or alternatively, in some examples, color data captured by one or more capture devices may be employed to not only represent a color, but to represent a more complex texture (e.g., which may include multiple colors). For instance, rather than associating such a texture with a particular voxel, color and/or texture data may be added to the final volumetric reconstruction based on a reprojecting back into the color space of each capture device (i.e., reprojecting into the data representative of colors and/or textures captured by the capture device and that includes color data representative of particular surface points of interest). As described above, one or more voxel nodes or sets thereof may correspond to one or more surface points in a volumetric reconstruction in any suitable way. Thus, as the reconstruction is generated, colors and/or textures captured by the different capture devices may be blended and associated directly with one or more surface points based on a vantage point of the volumetric reconstruction, rather than with specific voxel nodes. In this way, the representation may appear more realistic and accurate and less boxy and pixelated than if voxels are only associated with basic colors.

To determine which color or texture to associate with a particular surface point, color data captured by one or more capture devices may be used. For example, it may be determined which capture device was closest to the particular surface point, had the viewing angle most normal (i.e., straight on) to the particular surface point, or the like. This is because the color or texture captured by a nearby capture device from a relatively normal angle may be more accurate than the color or texture captured by a capture device that is far away from the particular surface point and/or has a viewing angle that is tangential to the particular surface point or is otherwise at a relatively sharp angle.

In examples where two or more capture devices each capture the particular surface point from different vantage points, the color data captured by each of these capture devices may be combined to obtain the final color or texture to be associated with the particular surface point in the volumetric reconstruction. For example, a color blending technique may be used to combine the color data using a weighted average where more weight is accorded to color data captured by capture devices with more preferable vantage points on the particular surface point (e.g., vantage points nearby the particular surface point or at normal angles to the particular surface point) and less weight is accorded to color data captured by capture devices that have less preferable vantage points on the particular surface point. Meanwhile, no weight may be accorded color data captured by capture devices that are not facing the particular surface point or do not have a viewing angle capable of contributing relevant color information.

Once confidence field values and color values for each voxel node have been determined based on the captured color and depth data and have been stored within the voxel data store as part of volumetric reconstruction 304, representation 306 may be further processed, packaged, formatted, and distributed to media player devices. The media player devices may proceed to render this data so as to present virtual reality content to users based on representation 306 of object 104 and based on other representations of other objects that have similarly been volumetrically reconstructed.

The preceding description of volumetric reconstruction 304 has provided a relatively high-level overview of how volumetric reconstruction methods and systems described herein may perform volumetric reconstruction based on a confidence field. A more specific description of certain exemplary aspects of volumetric reconstruction will now be described.

Figure 4:
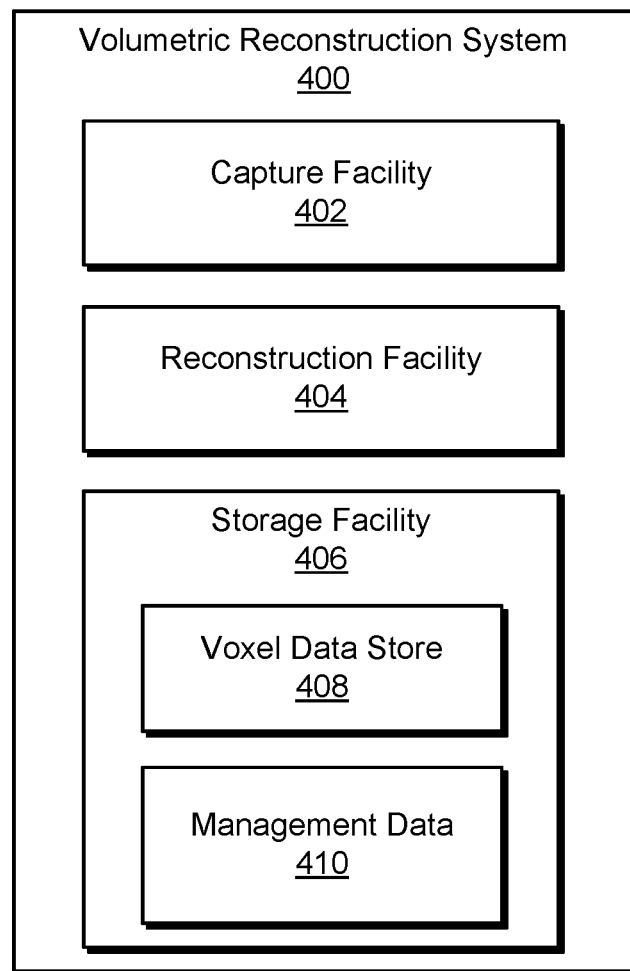
FIG. 4 illustrates an exemplary volumetric reconstruction system for volumetric reconstruction based on a confidence field according to principles described herein.

FIG. 4 illustrates an exemplary volumetric reconstruction system 400 ("system 400") for volumetric reconstruction based on a confidence field. As shown, system 400 may include, without limitation, a capture facility 402, a reconstruction facility 404, and a storage facility 406 selectively and communicatively coupled to one another. It will be recognized that although facilities 402 through 406 are shown to be separate facilities in FIG. 4, facilities 402 through 406 may be combined into fewer facilities, such as into a single facility, or divided into more facilities as may serve a particular implementation. In some examples, each of facilities 402 through 406 may be distributed between multiple devices and/or multiple locations as may serve a particular implementation. Each of facilities 402 through 406 will now be described in more detail.

Capture facility 402 may include one or more physical computing components (e.g., hardware and/or software components such as processors, memories, communication interfaces, instructions stored in memory for execution by the processors, etc.) and/or other components (e.g., color and/or depth capture devices, etc.) that are configured to perform various operations associated with capturing or otherwise accessing color and depth data representative of object surfaces in a real-world capture space. For example, as described and illustrated above, captured color and depth data may be captured by a plurality of capture devices (e.g., capture devices 106) positioned with respect to a real-world capture space (e.g., real-world capture space 102) so as to have different vantage points of surfaces of an object (e.g., surfaces 206 of object 104). After the captured color and depth data has been captured, or in real time as the color and depth data is being captured, capture facility 402 may access the captured color and depth data. For example, as mentioned above, capture facility 402 may access color and depth data by capturing the color and depth data in implementations where capture facility 402 implements the capture devices capturing the color and depth data, or may access the color and depth data by receiving or retrieving the color and depth data from a separate data capture system in implementations where capture facility 402 does not implement the capture devices.

Reconstruction facility 404 may include one or more physical computing components (e.g., hardware and/or software components separate from those of capture facility 402 or shared with capture facility 402) that perform various operations associated with generating and/or providing reconstructed color and depth data for a volumetric reconstruction of surfaces of objects included within the real-world capture space. As such, reconstruction facility 404 may generate (e.g., based on the captured color and depth data accessed by capture facility 402) reconstructed color and depth data for a volumetric reconstruction of the surface of the object by performing various operations with respect to the color and depth data. For example, reconstruction facility 404 may allocate voxel nodes within a voxel data store (e.g., within a voxel database implemented within integrated memory of a GPU that implements or is included within reconstruction facility 404). More particularly, reconstruction facility 404 may allocate a respective set of voxel nodes corresponding to each surface point in a plurality of surface points on the surface of the object in the real-world capture space. Moreover, the operations performed by reconstruction facility 404 to generate the reconstructed color and depth data may include determining and storing, within each voxel node in each of the respective sets of voxel nodes allocated within the voxel data store, a confidence field value that accounts for a distance factor associated with the voxel node and the surface point corresponding to the voxel node, and a noise-reduction factor associated with an additional voxel node adjacent to the voxel node. The operations performed by reconstruction facility 404 may further include determining the reconstructed color and depth data using a raytracing technique and based on the stored confidence field values within the voxel data store. These operations will be described and illustrated in more detail below.

Storage facility 406 may maintain any suitable data received, generated, managed, tracked, maintained, used, and/or transmitted by facilities 402 or 404 in a particular implementation. For example, as shown, storage facility 406 may include voxel data store 408 and management data 410. As described above, voxel data store 408 may be used to store, within allocated voxel nodes implemented within voxel data store 408, confidence field values, color values, and/or other reconstructed color and depth data used for a volumetric reconstruction. Voxel data store 408 may be included within a GPU included within system 400 and may be implemented in any of the ways described herein. Management data 410 may include data such as instructions (e.g., executable code, etc.), raw color and depth data (e.g., captured color and depth data that has not yet been reconstructed to be stored in voxel data store 408), and/or any additional or alternative data as may serve a particular implementation in facilitating system 400 to perform operations described herein.

Figure 5A:
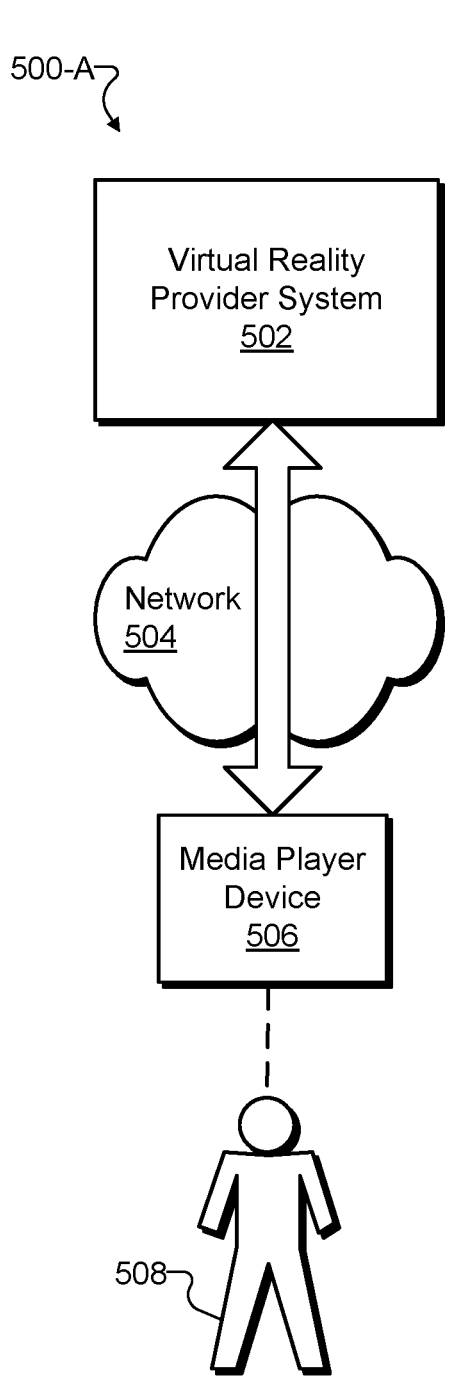
FIGS. 5A and 5B illustrate exemplary configurations in which the volumetric reconstruction system of FIG. 4 may be implemented according to principles described herein.
Figure 5B:
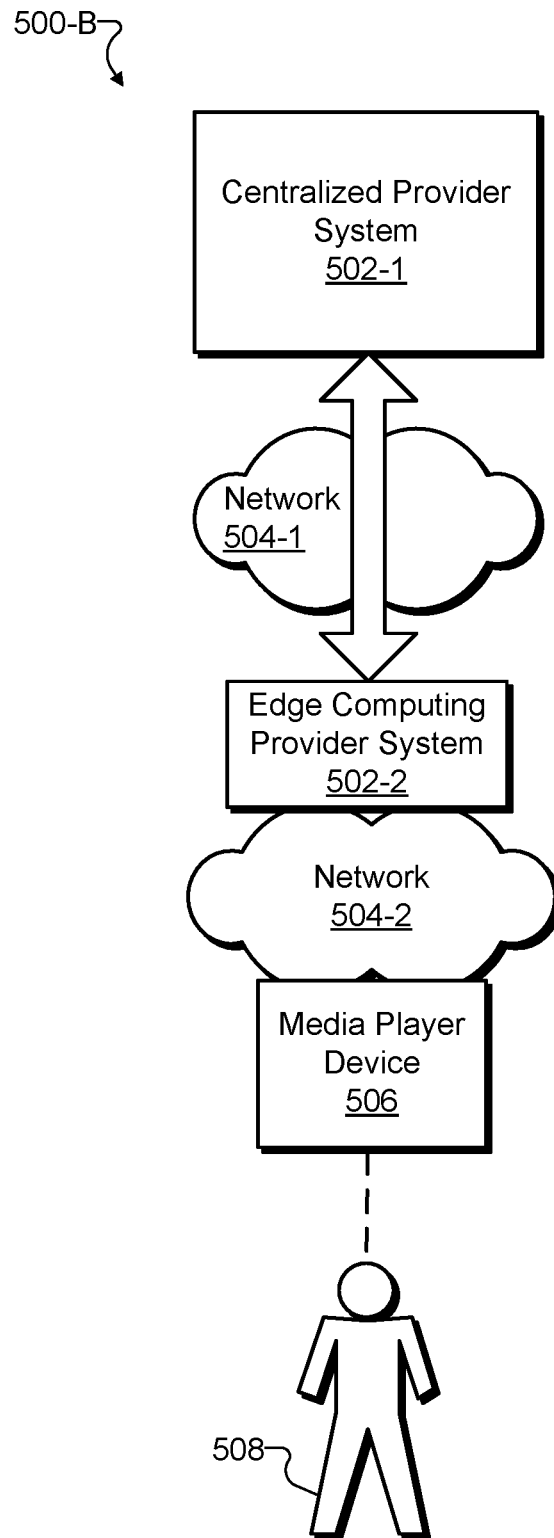

FIGS. 5A and 5B illustrate exemplary configurations 500 (e.g., configuration 500-A and configuration 500-B) within which system 400 may be implemented. Specifically, configuration 500-A in FIG. 5A depicts a virtual reality provider system 502 communicatively coupled, by way of a network 504, with a media player device 506 that is associated with (e.g., being used by) a user 508.

Virtual reality provider system 502 may be configured to generate virtual reality media content, based on captured color and depth data, to be experienced by users such as user 508. Additionally, after generating data representative of virtual reality media content, virtual reality provider system 502 may encode, package, encrypt, or otherwise process the data representative of the virtual reality media content and provide (e.g., transmit, multicast, broadcast, distribute, etc.) the data to media player device 506 for rendering. In some examples, the data representative of the virtual reality media content may include or be representative of a plurality of 2D video data streams (e.g., 2D video data streams associated with color and depth data captured at the vantage points of each of the capture devices 106) that may be processed and rendered by media player device 508. Additionally or alternatively, the data representative of the virtual reality media content may include one or more volumetric models (e.g., 3D or 4D models) of real-world objects included within the real-world capture space that may be rendered so as to be viewable from arbitrary vantage points. For instance, the data representative of the virtual reality media content may include reconstructed color and depth data of a volumetric reconstruction of an object such as object 104 within real-world capture space 102. The virtual reality media content may then be distributed by way of network 504 to one or more media player devices such as media player device 506 associated with user 508. For example, virtual reality provider system 502 may provide the virtual reality media content to media player device 506 so that user 508 may virtually experience real-world capture space 102 using media player device 506.

In some examples, it may be undesirable for user 508 to be limited to one or more discrete positions within an immersive virtual reality world represented by the virtual reality media content (e.g., representative of real-world capture space 102). As such, virtual reality provider system 502 may provide sufficient data within the virtual reality media content representative of real-world capture space 102 to allow the objects represented within the virtual reality media content to be rendered not only from the vantage points at which capture devices 106 are disposed, but also from any dynamically selectable vantage points corresponding to any arbitrary locations within the virtual reality world. For example, dynamically selectable virtual vantage points may be selected by user 508 while user 508 is experiencing the virtual reality media content using media player device 506.

In some examples, it may be desirable for the vantage points from which the objects are rendered to form a regular pattern (e.g., a 3D grid pattern or the like) that divides a scene into grid cells. In this way, objects within each grid cell may be represented orthogonally to create transmission and rendering efficiencies when the data is transmitted to media player device 506. In such examples, bounds of voxels nodes within each grid cell may be determined efficiently and/or in parallel in order to compute where orthogonal vantage points may be disposed. Additionally, each particular grid cell may be cropped based on the objects and/or surfaces contained therein, or may be dropped altogether in the case that the grid cell contains no objects or surfaces.

Network 504 may include a provider-specific wired or wireless network (e.g., a cable or satellite carrier network or a mobile telephone network), the Internet, a wide area network, a content delivery network, or any other suitable network. As such, data may flow between virtual reality provider system 502 and media player device 506 (as well as other media player devices not explicitly shown) using any communication technologies, devices, media, and protocols as may serve a particular implementation.

Media player device 506 may be used by user 508 to access and experience virtual reality media content received from virtual reality provider system 502. For example, media player device 506 may be configured to generate (e.g., based on data representative of virtual reality media content received from virtual reality provider system 502) an immersive virtual reality world to be experienced by user 508 from an arbitrary vantage point (e.g., a dynamically selectable vantage point selected by the user and corresponding to an arbitrary location within the virtual reality world). To this end, media player device 506 may include or be implemented by any device capable of presenting a field of view of the virtual reality world and detecting user input from user 508 to dynamically update the virtual reality world presented within the field of view as user 508 experiences the virtual reality world.

System 400 may be implemented in configuration 500-A in any suitable way. For example, system 400 may be implemented entirely within virtual reality provider system 502, entirely within media player device 506, or may be distributed between both virtual reality provider system 502 and media player device 506 by way of network 504. Various factors may be taken into account when determining where to implement system 400 within configuration 500-A. For example, because system 400 may utilize a high degree of computing power (which may be associated with a large amount of power, heat dissipation, physical space, etc.) or may be implemented using special hardware (e.g., a GPU including voxel database technology such as the GVDB technology of an NVIDIA GPU), it may be more convenient and/or practical for system 400 to be implemented by virtual reality provider system 502 than by media player device 506. On the other hand, because system 400 may operate best with a very low latency (e.g., a small amount of time for user input provided by user 508 to be received by system 400 and a small amount of time for reconstructed color and depth data processed by system 400 to be presented to user 508 in the form of virtual reality media content), it may be more convenient and/or practical for system 400 to be implemented nearer to user 508 such as at media player device 506 than to be implemented across a potentially high-latency network from user 508 such as at virtual reality provider system 502.

These requirements for a large degree of processing and a low degree of latency may be particularly relevant in implementations of system 400 in which the accessing of the captured color and depth data and the generating of the reconstructed color and depth data is performed in real time as the plurality of capture devices captures the captured color and depth data. In these implementations, system 400 may further provide the reconstructed color and depth data to media player device 506 for rendering by media player device 506 in real time as the accessing of the captured color and depth data and the generating of the reconstructed color and depth data is performed. As such, large processing capabilities and low latency capabilities may both be especially desirable for real-time implementations of system 400.

Configuration 500-B illustrates an alternative configuration in which edge computing may be utilized to implement system 400 in a way that may allow both processing and latency targets to be achieved.

To illustrate, FIG. 5B depicts configuration 500-B as being similar to configuration 500-A and including the same basic components described above. However, as shown in configuration 500-B, virtual reality provider system 502 may be divided into a centralized provider system 502-1 and an edge computing provider system 502-2, while network 504 may be divided into a relatively high latency portion labeled as network 504-1 and a relatively low latency portion labeled as network 504-2. As shown, while centralized provider system 502-1 is still separated from media player device 506 by the high latency of the entirety of network 504 (i.e., networks 504-1 and 504-2), one or more edge computing provider systems such as edge computing provider system 502-2 may be in communication with centralized provider system 502-1 while only being separated from media player device 506 by the low latency of network 504-2. In this way, system 400 may be implemented on edge computing provider system 502-2 to benefit from the high processing capabilities and low latency that edge computing provider system 502 may be configured to provide.

Regardless of what type of configuration (e.g., configuration 500-A, configuration 500-B, or another suitable con-figuration) and/or what system components within the configuration implement system 400, system 400 may include, as described above, a voxel data store (e.g., voxel data store 408) for storing a volumetrically reconstructed representation of surfaces of objects. As used herein, a "voxel data store" may refer to any suitable data storage facility and/or data storage structure as may be suitable for storing data representative of voxels for volumetric representations of object surfaces. For example, a voxel data store such as voxel data store 408 may be implemented as a tree-based data structure (e.g., an octree data structure) in which the voxel nodes in the respective sets of voxel nodes are stored in accordance with a three-dimensional position with which each of the voxel nodes is associated within the real-world capture space. In some examples, a voxel data store may be implemented using a voxel database (e.g., employing GVDB technology within an NVIDIA GPU) that is configured for storing three-dimensional volumetric data and that is readily traversable using a raytracing technique. In other examples, the voxel data store may utilize other suitable structures and/or data storage paradigms as may serve a particular implementation.

Figure 6:
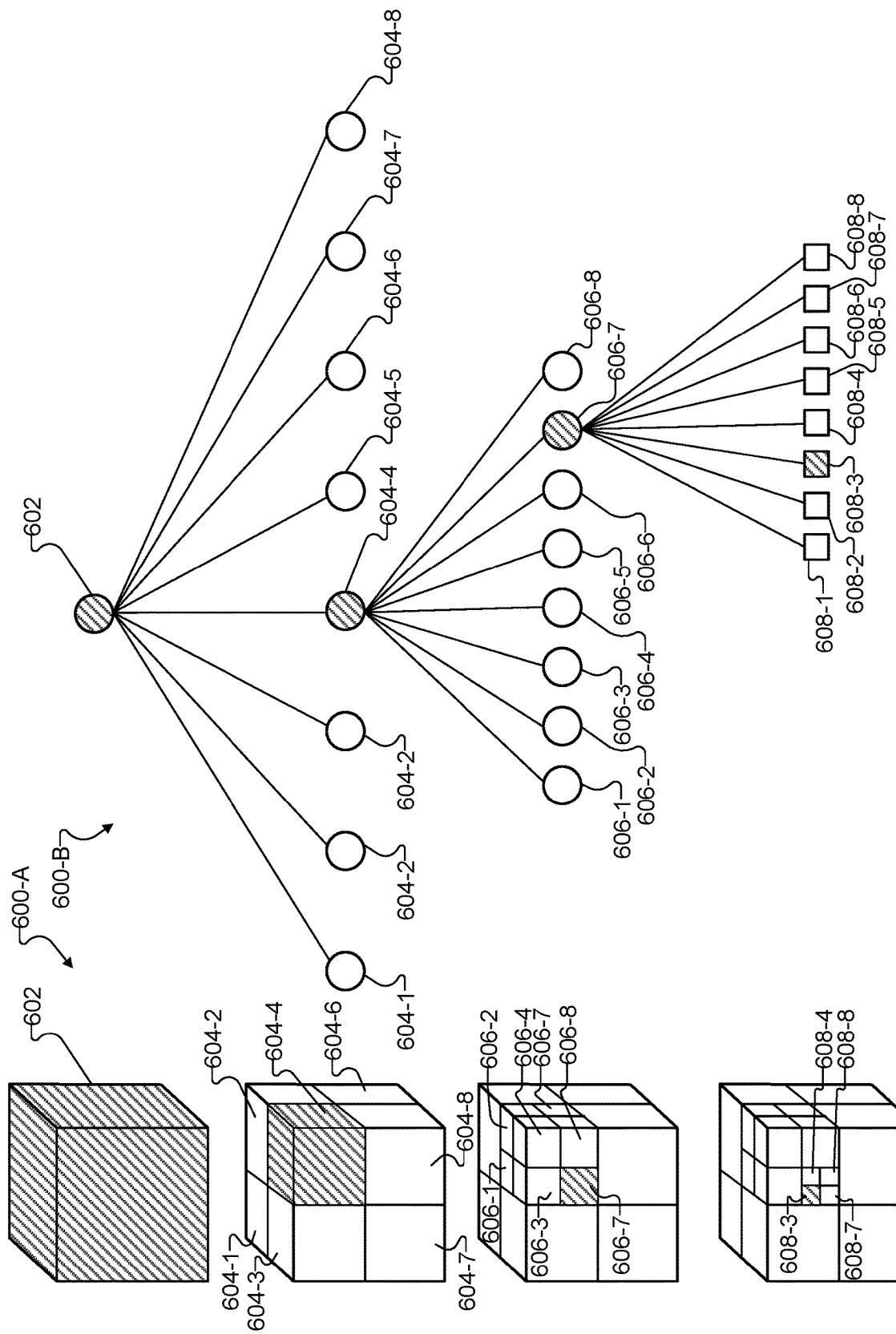
FIG. 6 illustrates an exemplary voxel data store including a plurality of voxel nodes corresponding to different surface points on a surface of an object that is being volumetrically reconstructed according to principles described herein.

FIG. 6 illustrates an exemplary voxel data store including a plurality of voxel nodes corresponding to different surface points on a surface of an object that is being volumetrically reconstructed. Specifically, a voxel data store referred to herein as voxel data store 600 is illustrated by way of a volumetric representation 600-A and a structural representation 600-B. Voxel data store 600 may be an implementation of voxel data store 408 in FIG. 4 and, as such, may be implemented in any of the ways described herein, such as by a voxel database in a GPU. As shown, voxel data store 600 is illustrated to take an octree data structure where each particular node corresponds to a cubic volume (e.g., a volume of three-dimensional space included within a real-world capture space that is being represented) that is divided into eight additional cubic volumes of equal size each corresponding to one of eight child nodes of the particular node. Any given cubic volume is divided up in this way until a plurality of leaf nodes that do not have child nodes is reached. Each of these leaf nodes may be representative of a single voxel in a three-dimensional representation, and, as such, may be referred to herein as "voxel nodes."

To illustrate more particularly, FIG. 6 shows a plurality of nodes 602, 604 (e.g., nodes 604-1 through 604-8), and 606 (e.g., nodes 606-1 through 606-8) These nodes lead to a plurality of leaf nodes or voxel nodes 608 (e.g., voxel nodes 608-1 through 608-8) representative of specific voxels within the real-world capture space associated with voxel data store 600. It will be understood that, while only one node in each level of the hierarchy includes child nodes in this example for clarity and simplicity of illustration, in certain implementations many or all of the nodes at each level of the hierarchy may be subdivided into child nodes, thereby potentially resulting in a significantly more complex structure than is illustrated in FIG. 6. Additionally, it will be understood that any suitable number of levels of the hierarchy of voxel data store 600 may be employed rather than the four levels shown for nodes 602, 604, 606, and 608.

In FIG. 6, volumetric representation 600-A illustrates 3D cubic volumes associated with each of nodes 602 through 608. Meanwhile, structural representation 600-B illustrates a conceptual view of the octree data structure corresponding to the volumes illustrated in volumetric representation 600-A. Specifically, structural representation 600-B illustrates a circle representative of each node that has one or more child nodes, a square representative of each leaf node (or voxel node), and lines illustrating the parent-child relationships between nodes at different levels in the hierarchy. It is noted that corresponding nodes are shaded in both representations 600-A and 600-B to illustrate the equivalency of these particular nodes between the two different representations of voxel data store 600.

As illustrated by both volumetric representation 600-A and corresponding structural representation 600-B, top level node 602 may correspond to an entirety of the three-dimensional space of a real-world capture space (e.g., real-world capture space 102) that is to be represented within voxel data store 600. The volume illustrating node 602 may be divided into eight equal subvolumes corresponding to nodes 604-1 through 604-8 (it will be noted that a subvolume corresponding to node 604-5 is not visible within FIG. 6 but will be understood to be present). Each subvolume associated with a node 604 may similarly be divided into subvolumes. For example, as shown, node 604-4 may be divided into eight equal subvolumes corresponding to nodes 606-1 through 606-8 (it will be noted that a subvolume corresponding to node 606-5 is not visible in FIG. 6 but will be understood to be present). Each node 606 may also be similarly divided into subvolumes. For example, as shown, node 606-7 may be divided into eight equal subvolumes corresponding to nodes 608-1 through 608-8 (it will be noted that subvolumes corresponding to nodes 608-1, 608-2, 608-5, and 608-6 are not visible in FIG. 6 but will be understood to be present).

In some examples, nodes 608 may continue to be divided into one or more subvolumes in a similar manner according to the octree hierarchy of voxel data store 600 described above. However, in the example illustrated, nodes 608 are illustrated as being leaf nodes or voxel nodes representative of the smallest unit of volume representable in this implementation (i.e., representative of individual voxels). As such, voxel nodes 608 may each store data for particular voxels such as confidence field values, color values (e.g., texture values), or the like. By organizing voxel data store 600 according to the octree data structure in this way, and by having all voxel-specific data stored only in voxel nodes 608 (e.g., rather than in nodes 602 through 606), system 400 may readily traverse voxel data store 600 to efficiently determine how light is to interact with the surfaces of the objects represented in voxel data store 600. For example, system 400 may utilize a raytracing technique to traverse voxel data store 600 quickly and efficiently to effectively simulate individual rays of light traveling through the real-world capture space to interact with (e.g., be reflected by) the surfaces of the objects represented by data stored in voxel data store 600.

More particularly, for instance, system 400 (e.g., reconstruction facility 404) may determine reconstructed color and depth data for a volumetric reconstruction of captured color and depth data of a surface of an object using a raytracing technique by traversing (e.g., in a manner simulating a light ray traveling from a particular vantage point in the real-world capture space to a particular surface point in the plurality of surface points on the surface of the object) a particular set of voxel nodes corresponding to the particular surface point. Because each voxel node in the set of voxel nodes may include a confidence field value, system 400 may determine when the ray of light being simulated is to be reflected by the surface based on meeting or surpassing a particular threshold confidence field value, such as will be described below. Based on the voxel node 608 that corresponded to the confidence field value that met or exceeded the particular threshold, system 400 may determine where the surface is. In other words, system 400 may determine the reconstructed color and depth data based on a position of a particular voxel node traversed as part of the traversing of the particular set of voxel nodes where the particular voxel node includes a confidence field value that meets a predetermined threshold that other confidence field values of other voxel nodes traversed prior to the particular voxel node do not meet.

As described herein, raytracing may refer to a type of data processing (e.g., a type of 3D data rendering) in which individual rays of light are simulated to travel from a particular vantage point at a particular heading (e.g., in a particular direction) until reaching and reflecting from a modeled surface in a representation of an object. Raytracing may be performed efficiently and conveniently using a data structure such as the octree structure of voxel data store 600 illustrated in FIG. 6 because the structure is readily traversable and lends itself to quickly skipping large sections of space that do not include surfaces of objects (e.g., that include only an invisible medium such as air or empty space). For instance, if system 400 simulates a ray travelling through a particular volume of space in which no object surface is present, no leaf nodes will be associated with the nodes being analyzed by system 400, allowing such volumes to be quickly skipped in search of the nearest surface on the heading of the simulated light ray. Only when a leaf node is actually present in the path of the ray (e.g., signifying that an object surface is near) does system 400 process any data.

In certain examples, surfaces of objects may be represented by voxels storing a particular value (e.g., a binary "1") while non-surfaces may be represented by voxels storing another value (e.g., a binary "0"). This simplistic paradigm may fairly represent certain types of surfaces in certain types of volumetric models. However, this paradigm may prove to be insufficient for realistically representing other types of surfaces in other types of volumetric representations. For instance, fluid or complex objects such as water, fire (e.g., explosions), visible gases (e.g., smoke, clouds, etc.), hair, and so forth may include complex surfaces and textures that do not lend themselves to representation using this type of blocky, on-off voxel representation paradigm. Additionally, representations of real-world surfaces that may not be particularly well-defined (e.g., because the representations are being generated based on imperfectly aligned data captured by multiple capture devices as the data is being captured and processed in real time) may similarly benefit from a more nuanced representation paradigm than the on-off voxel representation paradigm described above.

Figure 7:
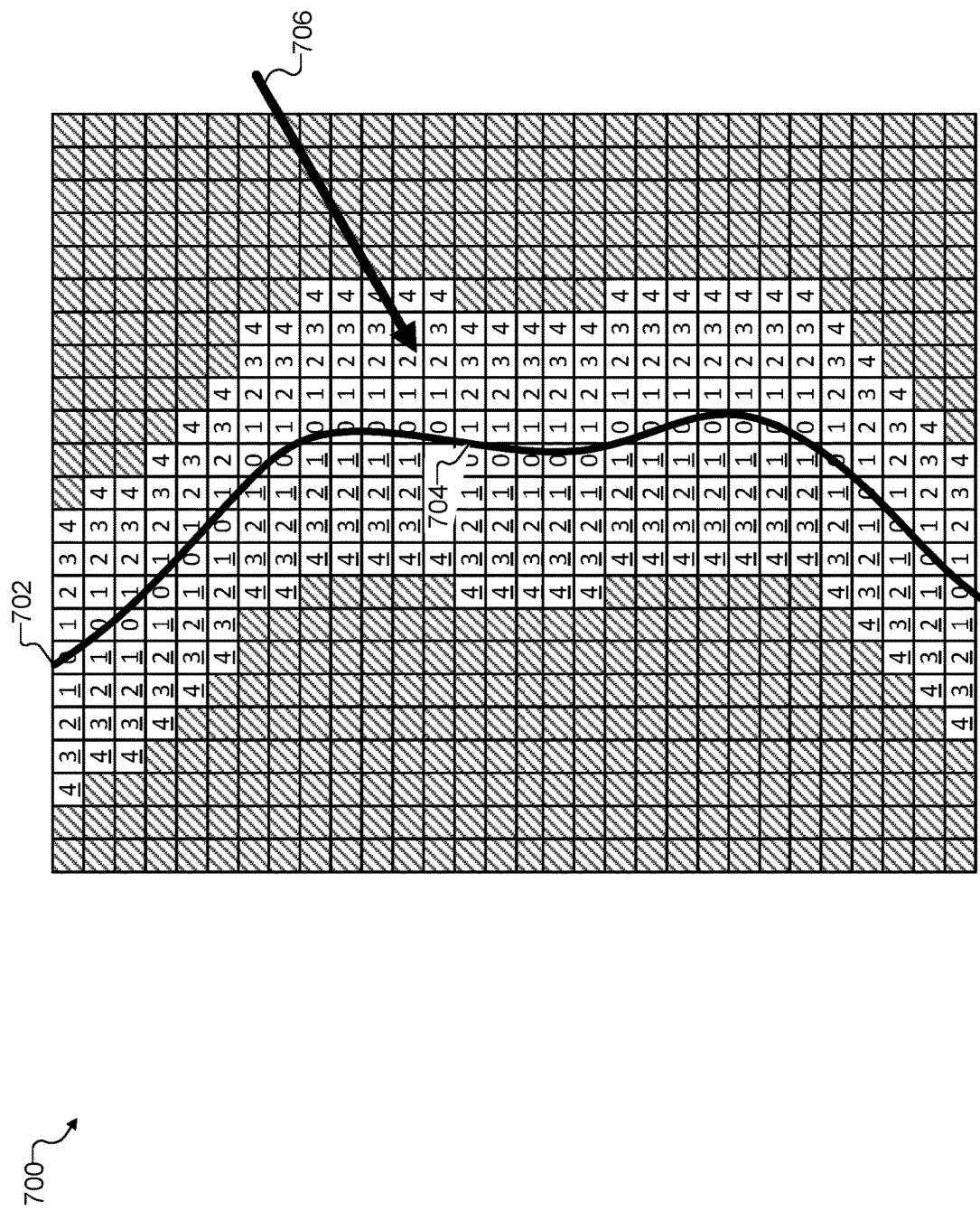
FIG. 7 illustrates an exemplary isosurface of an object along with an exemplary distance field associated with the isosurface and implemented by respective sets of voxel nodes corresponding to different surface points on the surface of the object according to principles described herein.
Figure 8:
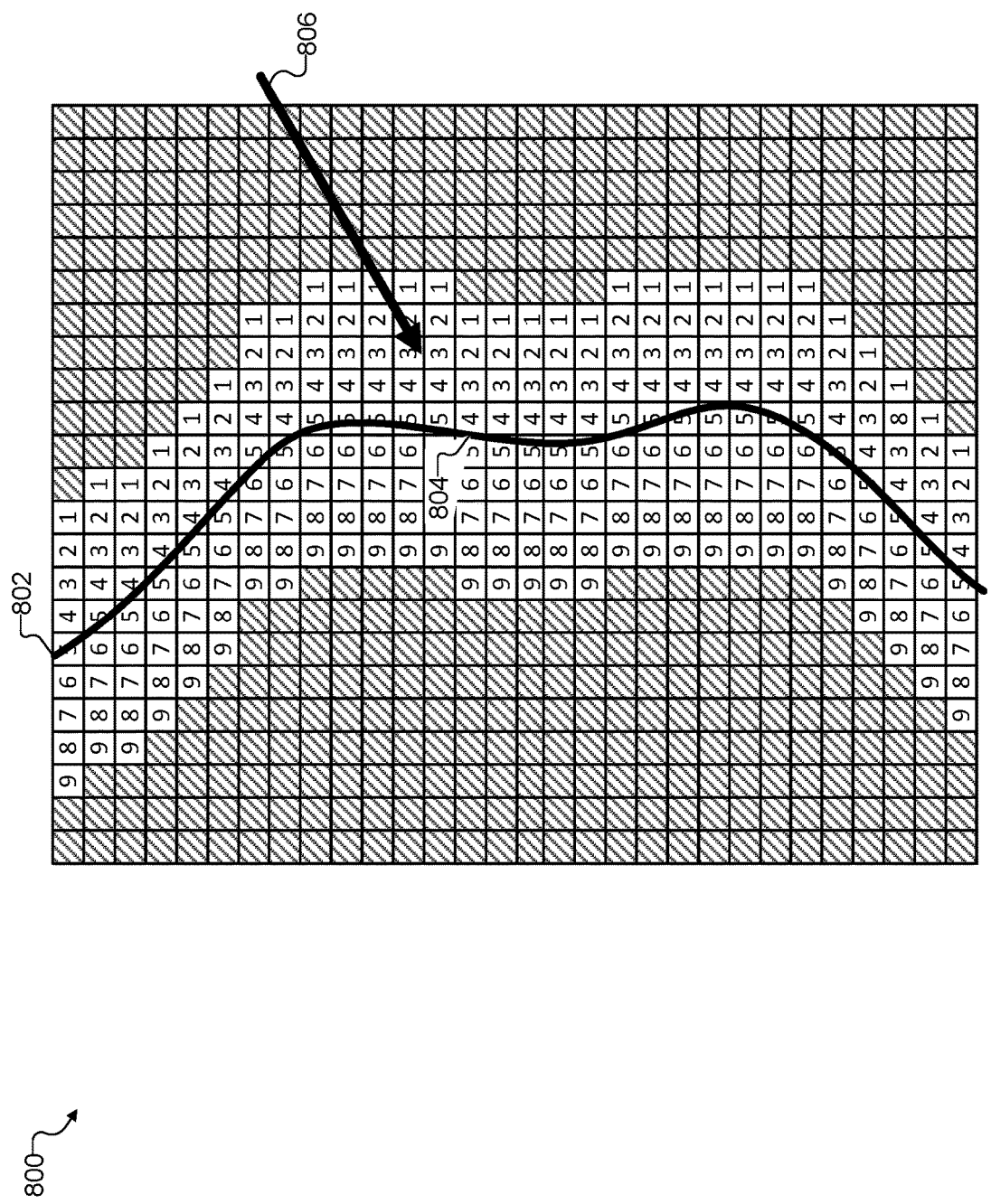
FIG. 8 illustrates an exemplary isosurface of an object along with an exemplary confidence field associated with the isosurface and implemented by respective sets of voxel nodes corresponding to different surface points on the surface of the object according to principles described herein.

Specifically, raytracing techniques may operate optimally (e.g., may result in the most realistic-looking renderings) when, rather than using binary values such as "1"s and "0"s, a field comprised of field values that are more nuanced than "1"s and "0"s is used. For example, a field such as a distance field, a density field, a confidence field, or another suitable field may be used to represent nuances existing in the interface between light and certain surfaces being represented. To illustrate, FIGS. 7 and 8 depict two different types of fields that may be implemented within a voxel data store to support volumetric reconstruction using a raytracing technique as described above. The fields depicted in FIGS. 7 and 8 will now be described.

FIG. 7 illustrates an exemplary isosurface associated with a surface of an object along with an exemplary distance field associated with the isosurface and implemented by respective sets of voxel nodes corresponding to different surface points on the surface of the object. Specifically, FIG. 7 includes a distance field 700 implemented by voxel nodes illustrated as small cubes similar to the structural representation of voxel nodes 608 in FIG. 6. As shown, each voxel node in FIG. 7 that is near an isosurface 702 associated with a surface of an object being represented by the voxel nodes may store a distance field value. For the sake of simplicity, the distance field values are represented by integers from −4 (e.g., represented in FIG. 7 as an underlined "4") to 4. However, it will be understood that distance field values may take any form such as integers across a wider or narrower range shown in distance field 700, floating point values, values representative of actual distances (e.g., with respect to units such as centimeters, millimeters, etc.), or any other values as may serve a particular implementation.

Distance field values may be determined for distance field 700 (e.g., and stored within voxel data store 600) in any manner as may serve a particular implementation. For example, surface points represented within depth data captured by the plurality of capture devices may be reprojected back into a captured representation of real-world capture space 102 to generate a point cloud from the raw depth data captured by the capture devices. Each point in this point cloud may serve as a basis for subdividing nodes (e.g., nodes 602, 604, 606, etc.) in a tree-based structure implementing the voxel data store (e.g., voxel data store 600). More particularly, each point in the point cloud may serve as a basis for allocating voxel nodes right on isosurface 702, along with voxel nodes in regions around these points, shown in FIG. 7. In this way, each point on isosurface 702 may be sufficiently defined by multiple voxel nodes (e.g., distance field values, confidence field values, etc.) in the vicinity of each point so as to be determined and sufficiently refined by calculations involving the field values included within the voxel nodes. For example, a particularly sized region (e.g., an 8×8 region) around each point in the point cloud point may be allocated in certain examples.

Isosurface 702 may correspond to a real surface of a real-world object in a real-world capture space that is being represented. As used herein, an "isosurface" may refer to any virtual surface that represents or otherwise corresponds to and/or is associated with a surface of an object. For example, an isosurface may represent a threshold beyond which rays of light do not pass (i.e., a threshold where simulated rays should reflect or be absorbed). Just as a physical light ray reflects from a surface of a real-world object, a simulated ray of light traversing a voxel data store in accordance with raytracing techniques described above may be determined to reflect in an analogous way when reaching isosurface 702 while traversing the voxel nodes included within voxel data store 600 and containing the distance field values illustrated in FIG. 7.

To illustrate, a point 704 on isosurface 702 may represent a physical surface point on a real-world object such as real-world object 104 described above. A simulated light ray 706 may be simulated to travel toward point 704 from an arbitrary vantage point from which it may be desirable to render the representation of the real-world object. As such, ray 706 may efficiently pass over a large amount of volume that represents empty space and has not been allocated in the voxel data store (i.e., the shaded boxes that could be allocated to be voxel nodes but have not been because they are not near an isosurface such as isosurface 702). As ray 706 is simulated to approach point 704 from the direction of the vantage point, each allocated voxel node (i.e., each of the voxel nodes shown to store a distance field value) may indicate a relative distance between isosurface 702 and the voxel node. As such, each distance value in distance field 700 may indicate how ray 706 is to interact with isosurface 702. For example, when ray 706 reaches or crosses a threshold (e.g., when reaching a distance value of 0 or a negative value), ray 706 may be reflected rather than continuing on the same bearing. Other values may cause ray 706 to interact with isosurface 702 in other ways simulating the bending of light rays, the absorption of light rays, the partial reflection and/or absorption of light rays, and so forth.

As shown in FIG. 7, a truncated distance field may be utilized rather than a full field in which every voxel node stores a value. As used herein, a "truncated field" such as a "truncated distance field" (shown in FIG. 7) or a "truncated confidence field" (shown below in FIG. 8) does not allocate or store a field value for every possible point in space. Rather, as shown, many potential voxel nodes illustrated as shaded boxes may remain unallocated as long as they are not near a particular surface being represented in the voxel data store. Truncated fields of this type may be advantageous for representing objects in a real-world capture space that includes a substantial amount of empty volume where no surface is present. For example, significant memory and other system resources may be conserved (e.g., thereby resulting in superior performance and so forth) by only allocating and storing data in voxel nodes that are near a surface. For example, a point cloud representative of many surface points on a surface of an object may be stored in a voxel data store by allocating voxel nodes based on determined positions of each surface point with respect to a translation from a universal real-world coordinate system (e.g., the world coordinate system associated with real-world capture space 102 described above in relation to configuration 100) to a universal virtual coordinate system associated with the voxel data store.

While allocating voxel nodes does not itself involve storing field values (e.g., distance field values, confidence field value, etc.), such voxel node allocation may be performed as a preliminary step prior to such field values being generated and/or stored. For example, once voxel nodes representative of a point cloud have been allocated, field values representative of distances, densities, confidence values, colors, textures, etc., of the surface represented by the point cloud may be stored in the allocated voxel nodes.

In certain examples, a confidence field may be implemented in a voxel data store rather than a distance field, binary field, or the like. For example, while a distance field may be useful for representing models of objects where there may be a high degree of certainty as to the position of any particular surface point (e.g., purely virtual models of objects, models based on depth data captured by an individual capture device, etc.), a confidence field may be better adapted for representing and cleaning up data not characterized by such certainty. For example, when representing real-world objects captured by a plurality of capture devices in a real-world capture space, there may be disagreement between different capture devices as to the respective positions of various surface points on the surfaces of the real-world object that are not possible to account for using a distance field alone. Additionally, and particularly when a real-world capture space is being captured and modeled in real time, capture artifacts and various types of noise may corrupt the data from different capture devices such that it may be desirable to filter out or otherwise clean up the noise using data from other capture devices (e.g., capture devices that may have had a more preferred viewing angle of a particular surface point, etc.).

To this end, FIG. 8 illustrates an exemplary isosurface of an object along with an exemplary confidence field associated with the isosurface and implemented by respective sets of voxel nodes corresponding to different surface points on the surface of the object. FIG. 8 is similar to FIG. 7 in many respects, but, rather than a distance field such as distance field 700, FIG. 8 includes a confidence field 800 implemented by the illustrated voxel nodes surrounding an isosurface 802 associated with a surface of an object being represented by the voxel nodes. As with the voxel nodes of FIG. 7, the voxel nodes of FIG. 8 may store field values. However, rather than distance field values as described above, the voxel nodes of FIG. 8 may store confidence field values that represent more than distance, density, or other such vectors.

Specifically, for example, each of the confidence field values stored within each voxel node in each of the respective sets of voxel nodes included in FIG. 8 may be configured to account for not only a distance factor associated with the voxel node and the surface point corresponding to the voxel node (e.g., similar to the distance field values of distance field 700), but also a noise-reduction factor associated with an additional voxel node adjacent to the voxel node. Moreover, other factors may also be accounted for in each confidence field value shown in confidence field 800 as will be described in more detail below and/or as may serve a particular implementation. Confidence field values may be determined for confidence field 800 (e.g., and stored within voxel data store 600) in any suitable way, such as any of the ways described above in relation to distance field values shown in FIG. 7.

Each confidence field value shown in confidence field 800 may be implemented as a numerical value between a minimum value and a maximum value that is greater than the minimum value. For instance, the confidence field value may account for the distance factor by using the minimum value if the voxel node represents a position external to the surface of the object at a predetermined surface thickness distance from the surface point and by using the maximum value if the voxel node represents a position internal to the surface of the object at the predetermined surface thickness distance from the surface point. If the voxel node represents a position of the surface point on the surface of the object (i.e., if the voxel node is right at an isosurface 802 similar to isosurface 702), the confidence value may account for the distance factor by using a midpoint value greater than the minimum value and less than the maximum value.

To illustrate, a point 804 on isosurface 802 may represent a physical surface point on a real-world object such as real-world object 104 described above. A simulated light ray 806 may be simulated to travel toward point 804 from an arbitrary vantage point from which it may be desirable to render the representation of the real-world object. As such, ray 806 may efficiently pass over a large amount of volume that represents empty space and has not been allocated in the voxel data store (i.e., the shaded boxes that could be allocated to be voxel nodes but have not been because they are not near an isosurface such as isosurface 802). As ray 806 is simulated to come within the predetermined surface thickness (e.g., 1 millimeter, 1 centimeter, 1 meter, or any other suitable surface thickness appropriate for the type of object and the surface being represented) of point 804 from the direction of the vantage point, each allocated voxel node (i.e., each of the voxel nodes shown to store a confidence field value) may indicate a relative distance between isosurface 802 and the voxel node. As such, each confidence field value in confidence field 800 may indicate how ray 806 is to interact with isosurface 802 in a similar way as described above for distance field 700. However, while the distance field values of distance field 700 are only configured to account for a distance factor, the confidence field values of confidence field 800 may also account for other factors (e.g., noise-reduction factors, agreement factors, etc.) as will be described in more detail below.

Additionally, rather than representing distances that decrease to 0 at the isosurface and go negative thereafter (as shown with distance field 700), the confidence field values in confidence field 800 may be implemented so as to be more akin to density values that start at a minimum value and increase moving into the surface, exceeding a threshold representative of isosurface 802 along the way. For example, as shown in FIG. 8, integer confidence field values from 1 to 9 are used to represent a very low confidence (e.g., a relatively low surface density or, equivalently, a high distance outside the isosurface) up to a very high confidence (e.g., a relatively high surface density or, equivalently, a relatively high distance past the isosurface into the object). While these integer values are convenient to use in depicting exemplary confidence field 800, it will be understood that confidence field values, in other implementations, may take any form as may serve a particular embodiment. For example, integers across a wider or narrower range than shown in confidence field 800, floating point values, or other suitable values may be used. In certain implementations, for instance, floating point values may be used where the maximum value (i.e., the value representing the highest possible degree of confidence) is 1.00, the minimum value (i.e., the value representing the lowest possible degree of confidence) is 0.00, and the midpoint value representing isosurface 802 is 0.50.

Regardless of which values confidence field 800 uses to represent voxels with lower confidence (i.e., voxels more likely to represent space outside of the object) and/or higher confidence (i.e., voxels more likely to represent points at the surface or inside the object), confidence field 800 may account for multiple factors that may all be incorporated in the overall confidence of the system about where surfaces are actually located in a real-world capture space and what captured color and depth data may be disregarded or modified to clean up undesirable artifacts or other noise in the data. For example, each confidence field value in confidence field 800 may account for a distance factor or density factor based on captured depth data from a single capture device or merged together from a plurality of different capture devices. Additionally, each confidence field value may further account for one or more additional factors such as a noise reduction factor, an agreement factor, or the like. Confidence field values accounting for some or all of these factors together may help create a clean, accurate volumetric reconstruction of the surfaces of the object within the voxel data store. Accordingly, exemplary techniques for generating confidence field values that account for certain exemplary factors will now be described.

Figure 9:
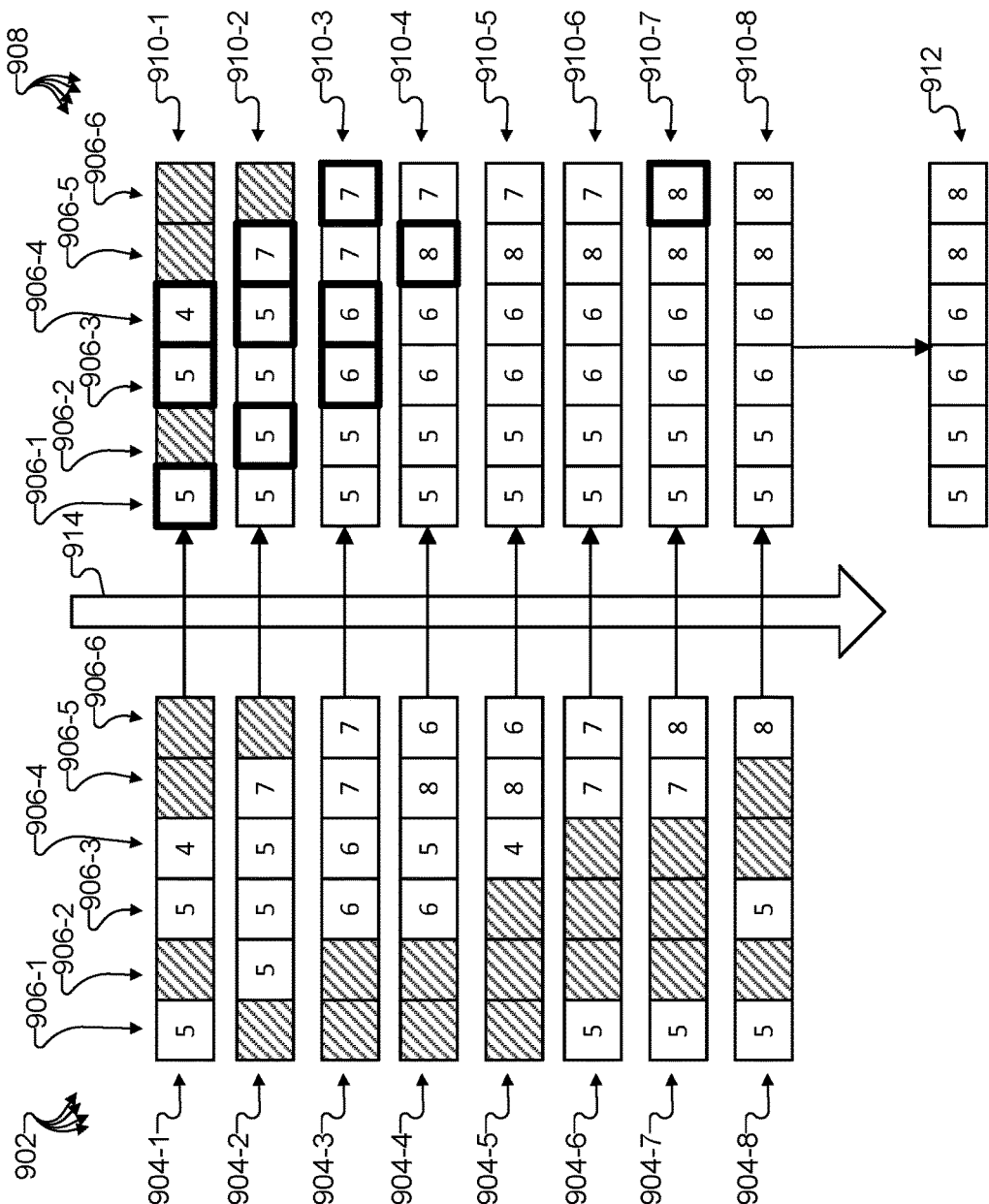
FIG. 9 illustrates an exemplary technique for generating confidence field values that account for a distance factor by combining data captured by a plurality of capture devices according to principles described herein.

FIG. 9 illustrates an exemplary technique for generating confidence field values that account for a distance factor by combining (e.g., merging) data captured by a plurality of capture devices. For example, as will be described in relation to FIG. 9, system 400 may determine and store a particular confidence field value within a particular voxel node in one of the respective sets of voxel nodes within the voxel data store as follows. First, system 400 may determine and store an intermediate confidence field value based on captured color and depth data captured by a first capture device in the plurality of capture devices. For example, the intermediate confidence field value may be a distance value, a density value, or another suitable type of value associated with a surface point to which the particular voxel node corresponds, and may be based on depth data captured by one particular capture device. As such, the intermediate confidence field value may not account for more than one factor, but rather may be similar to the distance field values included within distance field 700 in accounting for only a single factor such as distance or density of the voxel node with respect to the surface point.

Once system 400 determines and stores the intermediate confidence field value based on the captured color and depth data captured by the first capture device, system 400 may update the intermediate confidence field value for other capture devices in the plurality of capture devices (e.g., all or a subset of the capture devices in the plurality of capture devices other than the first capture device). For instance, the updating of the intermediate confidence field value may be based on captured depth data captured by each of the other capture devices. Subsequent to the updating of the intermediate confidence field value for each of the capture devices, system 400 may designate the intermediate confidence field value to be the confidence field value (e.g., treat the intermediate confidence field value as the confidence field value). For example, having determined the confidence field value for the particular voxel node as whatever the intermediate confidence field value has become subsequent to the updating, system 400 may store this confidence field value within the voxel data store.

To illustrate, various field values 902 representing, for example, distance field values, density field values, or the like that are derived from depth data captured by different capture devices (e.g., capture devices 106 illustrated in FIG. 1) are illustrated in FIG. 9. As shown, values 902 are arranged in different groups 904 (e.g., groups 904-1 through 904-8) based on the capture device that captured the data from which each value 902 was derived. Specifically, for instance, values 902 derived from depth data captured by a first capture device are included in group 904-1, values 902 derived from depth data captured by a second capture device are included in group 904-2, and so forth up through values 902 derived from depth data captured by an eighth capture device that are included in group 904-8.

The values 902 within each group 904 may correspond to particular voxels associated with (e.g., representative of spatial volumes at or near) particular surface points of a surface of a real-world object. The voxels and surface points to which values 902 correspond may be arbitrarily selected for purposes of illustration in FIG. 9. However, each group 904 may include values 902 corresponding to the same voxels and surface points as the other groups 904. This is illustrated in FIG. 9 with labels for different voxels 906 (e.g., voxels 906-1 through 906-6). Specifically, for example, the first value 902 in each group 904 may correspond to a same voxel 906-1, the second value 902 in each group 904 may correspond to a same voxel 906-2, and so forth. As shown, each voxel 906 represented in FIG. 9 has been detected by at least one of the capture devices (i.e., indicated by boxes that include numerical values). At the same time, there is at least one capture device for each voxel 906 that has not captured data for that voxel 906 (i.e., indicated by shaded boxes lacking any numerical value). This is to be expected for a configuration of capture devices such as configuration 100 where different capture devices have different vantage points on different sides of any given object included in the real-world capture space.

Because different capture devices have different vantage points with respect to the real-world spatial volumes corresponding to each voxel 906 represented by values 902, there may be approximate, but not perfect, alignment of values 902 derived from data captured by the different capture devices for each voxel 906. For example, the four capture devices that captured data from which values 902 were derived for voxel 906-1 are shown to be in full agreement (i.e., each of the values 902 is "5"), while the six capture devices that captured data from which values 902 were derived for voxel 906-6 are shown to not be in full agreement (i.e., the values 902 range from "6" to "8"). Accordingly, for each voxel 906, it may be desirable to combine or merge the different values 902 derived from each capture device into a single value to be stored as a confidence field value in a voxel node corresponding to the voxel 906. As described above, this may be performed iteratively by starting with values derived from data captured by one capture device and updating the values in light of data captured by each of the other capture devices one at a time until data captured by all the capture devices has been accounted for in a predetermined way that serves a particular implementation.

To illustrate, FIG. 9 depicts several intermediate confidence field values 908 in respective groups 910 (e.g., groups 910-1 through 910-8) corresponding to each of groups 904. Each of intermediate confidence values 908 is based on values 902 with an aim to ultimately determine the greatest value 902 for each voxel 906 to be designated as a confidence field value 912. To this end, intermediate confidence field values 908 within group 910-1 may be initialized to be equal to values 902 within group 904-1, as shown. These intermediate confidence field values 908 may then be progressively updated as values 902 from each group 904 are sequentially taken into account in accordance with a sequence 914. For example, the intermediate confidence field values 908 in group 910-2 may still include a value of "5" for voxel 906-1, a value of "5" for voxel 906-3, and may still have no value for voxel 906-6 as the values in group 904-2 are taken into account. However, the intermediate confidence field values 908 in group 910-2 may also be updated to a value of "5" for voxel 906-2 (i.e., where no value was previously available), to a value of "5" for voxel 906-4 (i.e., where the previous intermediate confidence field value 908 had a lesser value of "4"), and to a value of "7" for voxel 906-5 (i.e., where no value was previously available). The intermediate confidence field values 908 for each group 910-3 through 910-8 may be similarly updated based on the greatest value that has been identified so far in sequence 914 and based on the respective groups 904 of values 902. For example, as shown, each time an intermediate confidence field value 908 is updated from the previous confidence field value 908 above it, the updated intermediate confidence field value 908 is highlighted in bold.

Ultimately, confidence field values 912 for each of voxels 906 may represent the greatest value 902 derived for the particular voxel. As such confidence field values 912 may be stored in voxel nodes in a voxel data store to implement a confidence field such as confidence field 800. Accordingly, the voxel nodes generated and stored in this way may account for the distance factor because a confidence field value for the position (e.g., real-world spatial volume) represented by each voxel node has been determined based on a maximum position for the voxel node from a plurality of potential positions for the voxel node each associated with different data captured by different capture devices. In other words, each confidence field value 912 is ultimately determined so as to represent a maximum value that was derived for the particular voxel based on data captured from all of the capture devices. Alternatively, instead of a maximum value, other ways of combining values 902 such as using a minimum value, a summation of values, an average value, or any other suitable manner of combining values 902 may be employed.

Along with accounting for the distance factor as described in relation to FIG. 9, system 400 may also account for a noise-reduction factor when generating confidence field values such as confidence field values 912. Accounting for a noise-reduction factor may be performed based on an assumption that real (i.e., non-noise) surface points will typically be expected to be similar to neighboring (e.g., adjacent) surface points such that respective sets of voxel nodes corresponding to neighboring surface points should include similar confidence field values. Conceptually, one way to express this assumption may be that surface point mappings represented within volumetric reconstructions are expected to be relatively "smooth" (i.e., with few sharp edges or other abrupt changes from point to point). Accordingly, confidence field values within each voxel node within the voxel data store may account for the noise reduction factor by being adjusted slightly to become more similar to confidence field values of neighboring voxel nodes.

Specifically, for a particular confidence field value associated with a particular voxel node associated with a particular surface point, system 400 may determine a first intermediate confidence field value that accounts for the distance factor associated with the voxel node and the surface point and determine a second intermediate confidence field value that accounts for a distance factor associated with an additional voxel node adjacent to the voxel node and the surface point. System 400 may update the first intermediate confidence field value based on the second intermediate confidence field value in any suitable manner. For example, system 400 may update the first intermediate confidence field value by increasing the first intermediate confidence field value if the second intermediate confidence field value is greater than the first intermediate confidence field value and/or by decreasing the first intermediate confidence field value if the second intermediate confidence field value is lesser than the first intermediate confidence field value. Subsequent to the updating of the first intermediate confidence field value, system 400 may designate the first intermediate confidence field value to be the confidence field value (e.g., may use the updated intermediate confidence field value as the confidence field value that is stored in the voxel data store).

Figure 10:
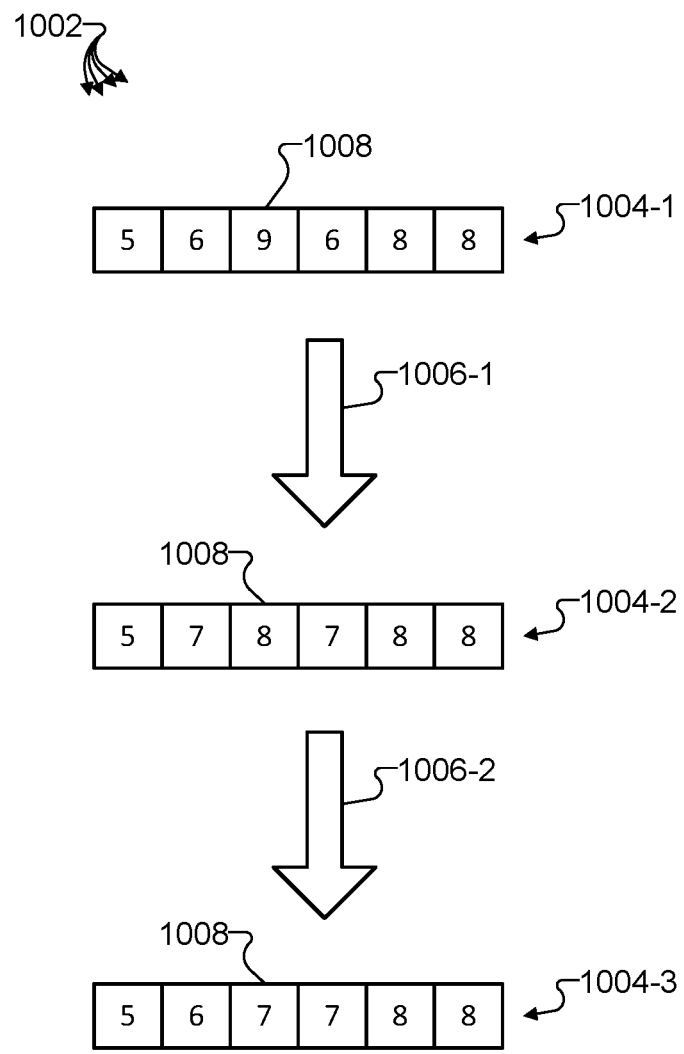
FIG. 10 illustrates an exemplary technique for generating confidence field values that account for a noise-reduction factor by smoothing confidence field values between adjacent voxel nodes according to principles described herein.

To illustrate how such noise-reduction factors may be accounted for, FIG. 10 illustrates an exemplary technique for generating confidence field values that account for a noise-reduction factor by smoothing confidence field values between adjacent voxel nodes. More particularly, FIG. 10 depicts a plurality of intermediate values 1002 as the values are progressively modified from a first iteration 1004-1 to a second iteration 1004-2 and through to a third iteration 1004-3 by way of multiple passes 1006 (e.g., passes 1006-1 and 1006-2) of a smoothing technique applied to the intermediate values 1002.

Intermediate values 1002 may be any suitable values determined or derived in any of the ways described herein. For example, intermediate values 1002 may represent distance field values, density field values, or the like, derived from data captured by an individual capture device. In other examples, intermediate values 1002 may represent confidence field values derived from data captured by a plurality of capture devices. For instance, intermediate values 1002 may have been determined to already account for a distance factor and/or one or more other factors such as confidence field values 912 described above.

Unlike values 902 and 908 described above as being associated with voxels and surface points at arbitrary positions, it will be understood that intermediate values 1002 may represent voxels that have a well-defined (non-arbitrary) spatial relationship to one another. For example, each of values 1002 may be associated with consecutive, adjacent surface points along a surface of an object such as object 104. As such, it may be expected that intermediate values 1002 should be similar to one another, or should at least be relatively smooth (i.e., not including intermediate values that are drastically different from neighboring values, as this may be indicative of noise).

For this reason, a particular intermediate value 1008 depicted in iteration 1004-1 may stand out as being a likely candidate for representing noise, rather than representing a real surface point. As shown, intermediate value 1008 has a value of "9" in iteration 1004-1, which may be significantly different from the neighboring intermediate values 1002, which are both "6". It may be that intermediate value 1008 is correct and is associated with a surface point that is significantly different from neighboring surface points. However, it may be more likely that intermediate value 1008 is inaccurate and is representative of noise. As such, when first pass 1006-1 of the smoothing technique is performed to generate iteration 1004-2 of intermediate values 1002, intermediate value 1008 is adjusted downward to a value closer to the neighboring values of "6" (i.e., adjusted from a value of "9" down to a value of "8"), while the neighboring values are adjusted upward to values of "7".

Already, intermediate values 1002 are smoother in iteration 1004-2 than in iteration 1004-1. However, after another pass 1006-2 to generate iteration 1004-3 from iteration 1004-2, intermediate values 1002 are smoother still. In iteration 1004-3, intermediate value 1008 now has a value of "7" which is very close to both neighboring intermediate values. Unlike in iteration 1004-1, intermediate values 1002 smoothly increase in iteration 1004-3 from a value of "5" to a value of "8". If iteration 1004-3 is a final iteration for a particular implementation (e.g., no further passes 1006 of the smoothing technique are to be applied to further smooth the intermediate values), the intermediate values 1002 may be designated as confidence field values to be stored in the voxel data store and/or to be further processed to account for one or more other factors described herein or as may serve a particular implementation.

In certain examples, a smart smoothing technique may be employed to differentiate areas where sharp edges and large discrepancies between neighboring voxel nodes are indicative of likely noise from areas where such edges or discrepancies are indicative of actual characteristics of object surfaces. In this way, subtle surface details and features that contrast with the surface of the object around them (e.g., edges of objects that in reality sharply contrast with their surroundings) may not be artificially smoothed or softened.

Along with or as an alternative to accounting for the distance factor and/or the noise-reduction factor as described in relation to FIGS. 9 and 10, system 400 may account for an agreement factor when generating confidence field values. Accounting for an agreement factor may be performed based on an assumption that noise related to a particular surface point may be unique to an individual capture device while data associated with real (i.e., non-noise) surface points will typically be captured by a plurality of capture devices (e.g., two capture devices, three capture devices, etc.). Accordingly, confidence field values within each voxel node within the voxel data store may account for an agreement factor associated with a detection (e.g., by at least two capture devices in the plurality of capture devices) of the surface point corresponding to the voxel node. In other words, system 400 may determine confidence field values for the voxel nodes to account for the agreement factor by only storing confidence field values in the voxel data store for surface points that are detected by one capture device and corroborated by at least one additional capture device.

Figure 11:
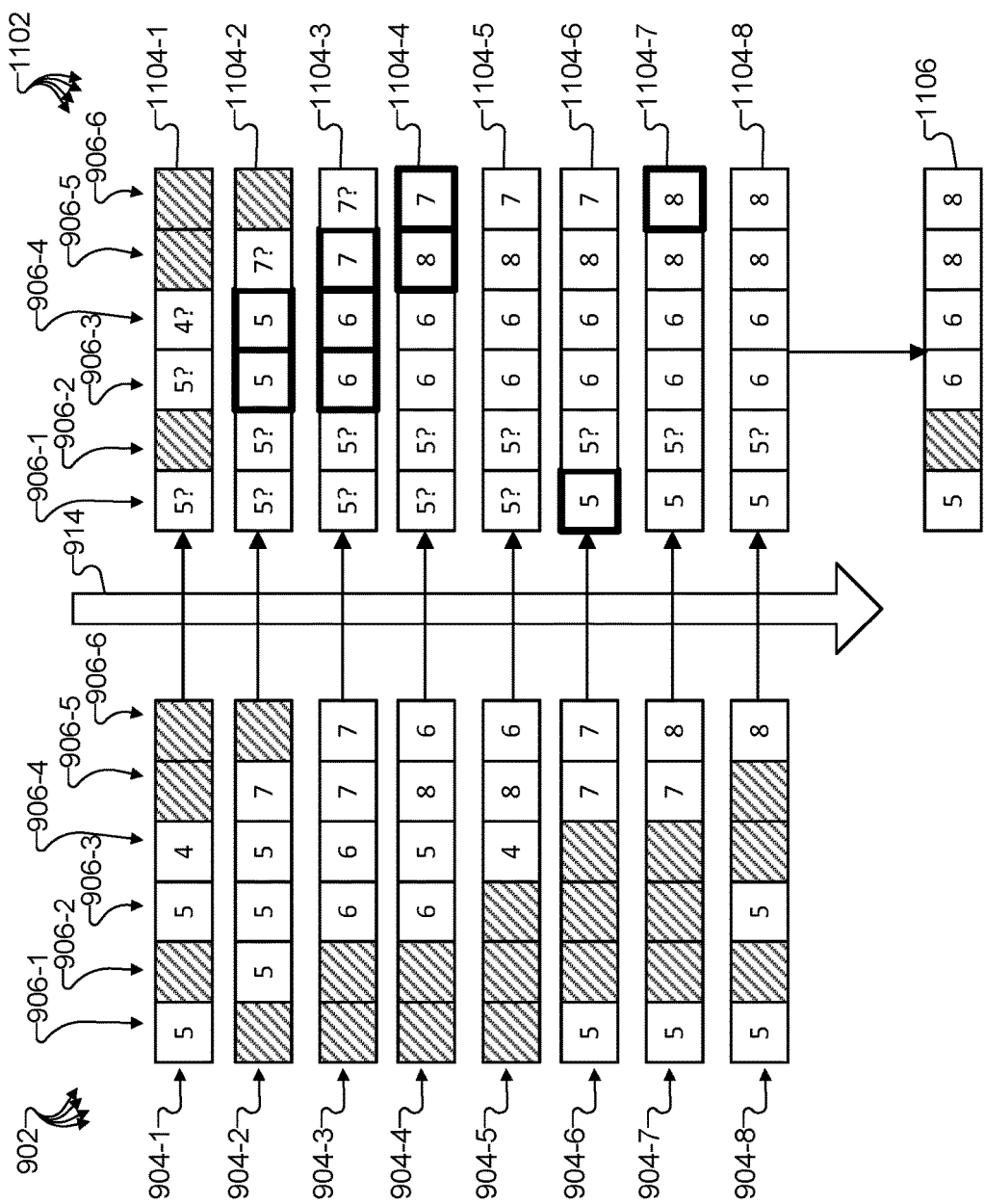
FIG. 11 illustrates an exemplary technique for generating confidence field values that account for an agreement factor associated with a detection of surface points by at least two capture devices according to principles described herein.

To illustrate how an agreement factor may be accounted for, FIG. 11 illustrates an exemplary technique for generating confidence field values that account for an agreement factor associated with a detection of surface points by at least two capture devices. More particularly, FIG. 11 depicts the same values 902 arranged in the same groups 904 based on the capture devices from which the values were derived as described above in relation to FIG. 9. As with FIG. 9, each of values 902 in FIG. 11 is associated with one of voxels 906 and is to be combined with other values 902 for the same voxel 906 (i.e., values 902 for the same voxel 906 that are based on data captured by other capture devices). In contrast to intermediate confidence field values 908 in FIG. 9, however, FIG. 11 illustrates a plurality of intermediate confidence field values 1102 that are being determined so as to not only account for a distance factor (as described above with intermediate confidence field values 908) but also so as to account for an agreement factor. As shown, intermediate confidence field values 1102 are arranged in different groups 1104 (e.g., groups 1104-1 through 1104-8) to show an evolution of intermediate confidence field values 1102 as each group 904 of values 902 are accounted for during sequence 914.

The agreement factor may be accounted for in any manner as may serve a particular implementation. For example, as illustrated in FIG. 11, each intermediate confidence field value 1102 that has only been detected by one capture device as the sequence 914 of capture device data is applied to the intermediate confidence field values is designated as a provisional confidence field value (i.e., a value marked with a question mark: "?"). Only after a value 902 based on data captured by a second capture device corroborates the existence of a real surface point with which a particular voxel 906 is associated is this provisional status removed (i.e., designated by a bold highlighting and a removal of the question mark "?"). Accordingly, as shown, the intermediate confidence field values 1102 for voxel 906-1 are considered to be provisional confidence field values (i.e., "5?") until data captured by the sixth capture device is accounted for and values 902 in group 904-6 corroborate that voxel 906-1 is associated with a real (i.e., non-noise) surface point.

As further shown, because no other group 904 besides group 904-2 can corroborate that voxel 906-2 exists, this voxel is ultimately assumed to be noise and is not included (e.g., is not allocated and stored in the voxel data store) with a plurality of other confidence field values 1106 that are ultimately determined and stored. Accordingly, while confidence field values 1106 are generally the same as confidence field values 912 in FIG. 9, FIG. 11 illustrates that by further accounting for the agreement factor along with the distance factor, at least one voxel (i.e., voxel 906-2) that may otherwise have been represented in the volumetric reconstruction may be determined to be noise and may thus be left out of the volumetric reconstruction, thereby improving the volumetric reconstruction as described above.

Figure 12:
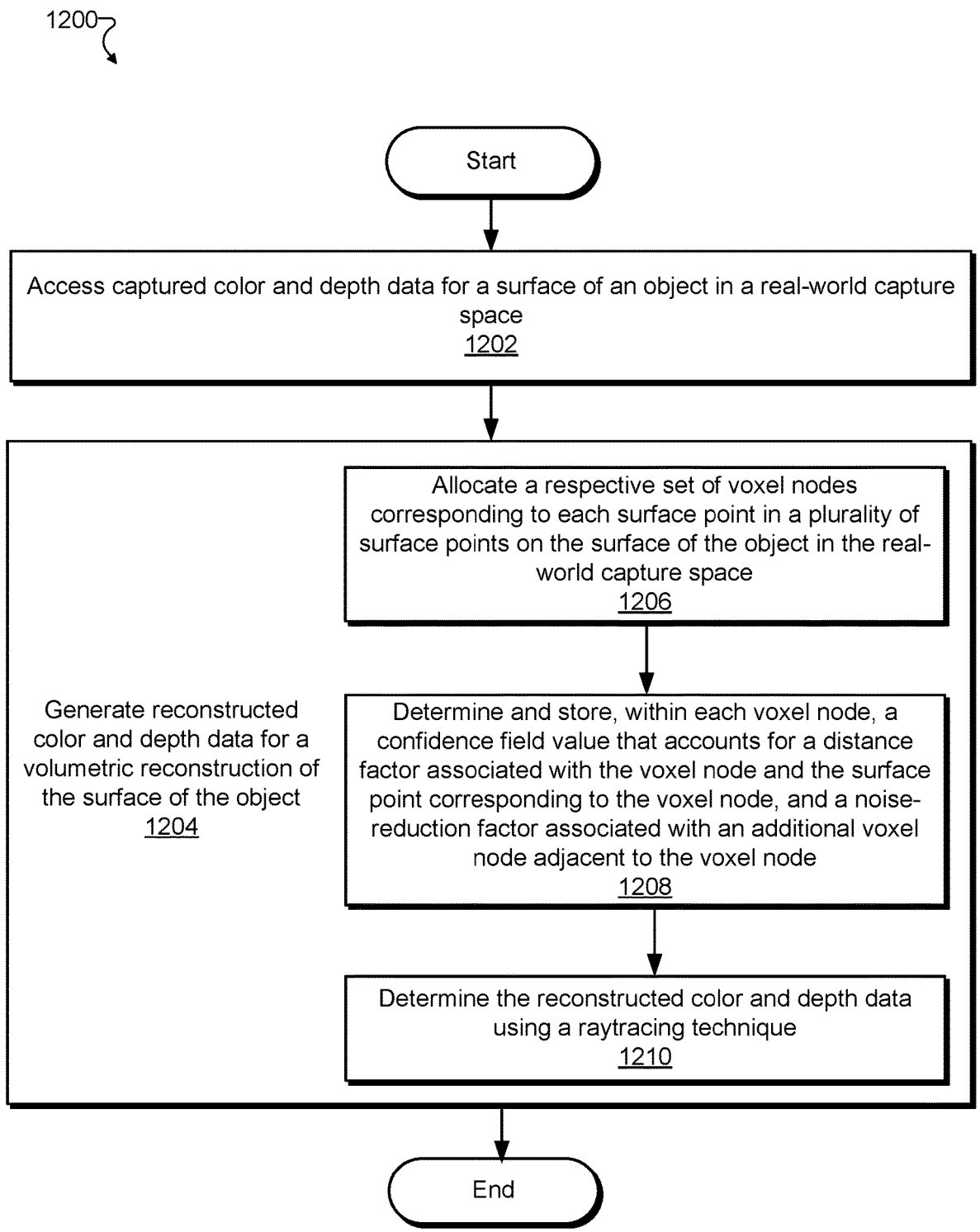
FIGS. 12 and 13 illustrate exemplary methods for volumetric reconstruction based on a confidence field according to principles described herein.

FIG. 12 illustrates an exemplary method for volumetric reconstruction based on a confidence field. While FIG. 12 illustrates exemplary operations according to one embodiment, other embodiments may omit, add to, reorder, and/or modify any of the operations shown in FIG. 12. One or more of the operations shown in FIG. 12 may be performed by system 400 and/or by any implementation thereof.

In operation 1202, a volumetric reconstruction system may access captured color and depth data for a surface of an object in a real-world capture space. For example, the captured color and depth data may have been captured by a plurality of capture devices positioned with respect to the real-world capture space so as to have different vantage points of the surface of the object. Operation 1202 may be performed in any of the ways described herein.

In operation 1204, the volumetric reconstruction system may generate reconstructed color and depth data for a volumetric reconstruction of the surface of the object. For example, the volumetric reconstruction system may generate the reconstructed color and depth data based on the captured color and depth data accessed in operation 1202. Operation 1204 may be performed in any of the ways described herein. For example, as shown in FIG. 12, operation 1204 may be performed by performing operations 1206 through 1210, described below.

In operation 1206, the volumetric reconstruction system may allocate, within a voxel data store, a respective set of voxel nodes corresponding to each surface point in a plurality of surface points on the surface of the object in the real-world capture space. Operation 1206 may be performed in any of the ways described herein.

In operation 1208, the volumetric reconstruction system may determine and store a confidence field value within each voxel node in each of the respective sets of voxel nodes allocated within the voxel data store. For example, each confidence field value of each voxel node may account for a distance factor associated with the voxel node and the surface point corresponding to the voxel node. Additionally, each confidence field value of each voxel node may account for a noise-reduction factor associated with an additional voxel node adjacent to the voxel node. In other examples, in addition to accounting for a distance factor as described herein, each confidence field value of each voxel node may account for an agreement factor or a combination of the noise-reduction factor and the agreement factor as described herein. Operation 1208 may be performed in any of the ways described herein.

In operation 1210, the volumetric reconstruction system may determine the reconstructed color and depth data based on the stored confidence field values within the voxel data store. For instance, the volumetric reconstruction system may determine the reconstructed color and depth data using a raytracing technique. Operation 1210 may be performed in any of the ways described herein.

Figure 13:
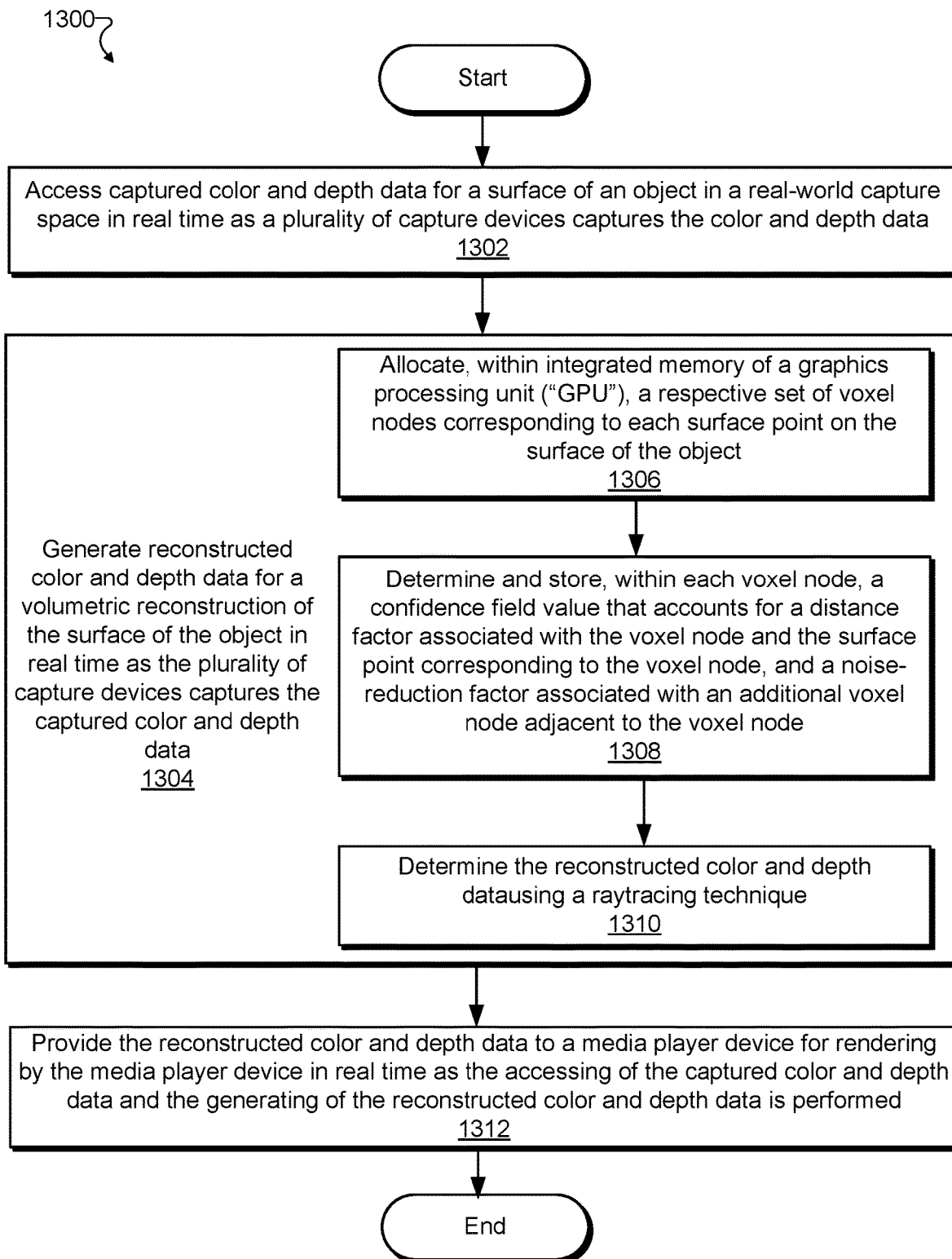

FIG. 13 illustrates an exemplary method for volumetric reconstruction based on a confidence field. While FIG. 13 illustrates exemplary operations according to one embodiment, other embodiments may omit, add to, reorder, and/or modify any of the operations shown in FIG. 13. One or more of the operations shown in FIG. 13 may be performed by system 400 and/or by any implementation thereof.

In operation 1302, a volumetric reconstruction system may access captured color and depth data for a surface of an object in a real-world capture space. For example, the volumetric reconstruction system may access the color and depth data in real time as a plurality of capture devices captures the color and depth data for the surface of the object. In some examples, the plurality of capture devices may be positioned with respect to the real-world capture space so as to have different vantage points of the surface of the object. Operation 1302 may be performed in any of the ways described herein.

In operation 1304, the volumetric reconstruction system may generate reconstructed color and depth data for a volumetric reconstruction of the surface of the object. For example, the volumetric reconstruction system may generate the reconstructed color and depth data based on the captured color and depth data accessed in operation 1302. In some examples, operation 1304 may be performed in real time as the plurality of capture devices captures the captured color and depth data as part of operation 1302. Operation 1304 may be performed in any of the ways described herein. For example, as shown in FIG. 13, operation 1304 may be performed by performing operations 1306 through 1310, described below.

In operation 1306, the volumetric reconstruction system may allocate voxel nodes within a voxel data store implemented within integrated memory of a GPU included within the volumetric reconstruction system. For example, the volumetric reconstruction system may allocate a respective set of voxel nodes corresponding to each surface point in a plurality of surface points on the surface of the object in the real-world capture space. Operation 1306 may be performed in any of the ways described herein.

In operation 1308, the volumetric reconstruction system may determine and store a confidence field value within each voxel node in each of the respective sets of voxel nodes within the voxel data store. For example, each confidence field value in each voxel node may account for a distance factor associated with the voxel node and the surface point corresponding to the voxel node. Additionally or alternatively, each confidence field value in each voxel node may account for a noise-reduction factor associated with an additional voxel node adjacent to the voxel node. In other examples, in addition to accounting for a distance factor as described herein, each confidence field value of each voxel node may account for an agreement factor or a combination of the noise-reduction factor and the agreement factor as described herein. Operation 1308 may be performed in any of the ways described herein.

In operation 1310, the volumetric reconstruction system may determine the reconstructed color and depth data based on the confidence field values stored within the voxel data store in operation 1308. For instance, the volumetric reconstruction system may determine the reconstructed color and depth data using a raytracing technique. Operation 1310 may be performed in any of the ways described herein.

In operation 1312, the volumetric reconstruction system may provide the reconstructed color and depth data to a media player device for rendering by the media player device. For example, the volumetric reconstruction system may provide the reconstructed color and depth data in real time as the accessing of the captured color and depth data in operation 1302 and the generating of the reconstructed color and depth data in operation 1304 is performed. Operation 1312 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 14:
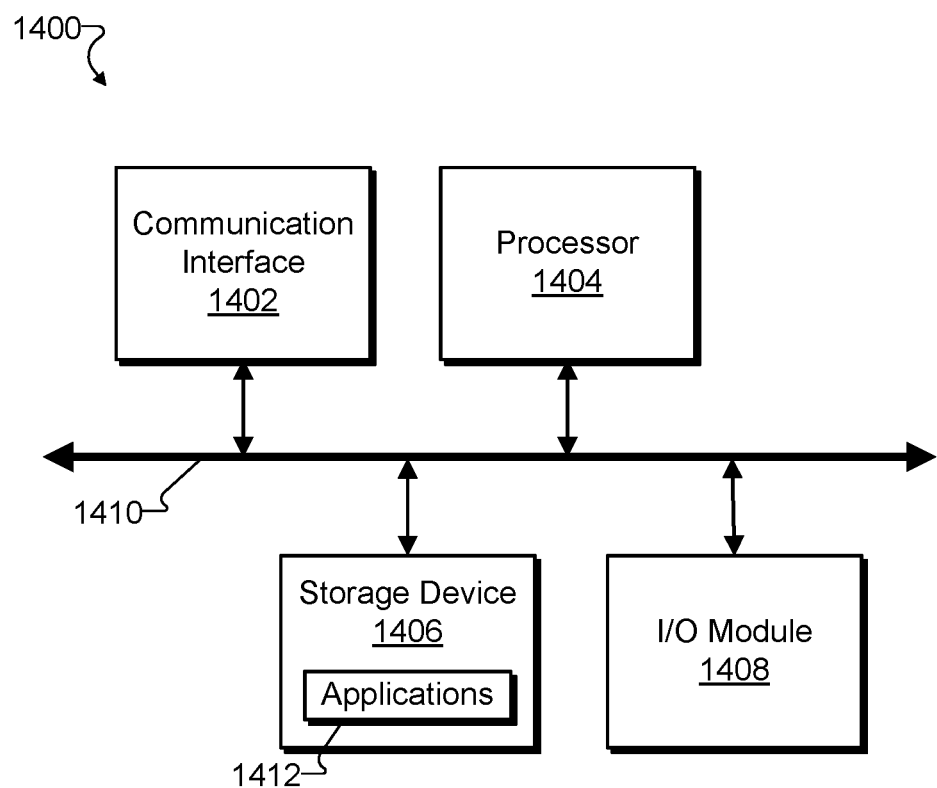
FIG. 14 illustrates an exemplary computing device according to principles described herein.

FIG. 14 illustrates an exemplary computing device 1400 that may be specifically configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit (e.g., a central processing unit and/or a graphics processing unit) capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. One or more I/O modules may be used to receive input for a single virtual reality experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more operations or functions associated with facilities 402 or 404 of system 400 (see FIG. 4). Likewise, storage facility 406 of system 400 may be implemented by or within storage device 1406.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a computing system, color and depth data captured from a plurality of different vantage points for a surface point on a surface of an object;
   determining, by the computing system based on the color and depth data captured from the plurality of different vantage points, a confidence field value associated with the surface point; and
   generating, by the computing system based on the confidence field value associated with the surface point, reconstructed color and depth data for a volumetric reconstruction of the surface of the object.

2. The method of claim 1, further comprising allocating, by the computing system within a voxel data store, a set of voxel nodes corresponding to the surface point;
   wherein the confidence field value associated with the surface point is stored within a particular voxel node of the set of voxel nodes corresponding to the surface point.

3. The method of claim 2, wherein:
   the confidence field value is implemented as a numerical value between a minimum value and a maximum value greater than the minimum value; and
   the determining of the confidence field value is based on a distance factor associated with the surface point and the particular voxel node and includes:
   using the minimum value if the particular voxel node represents a position external to the surface of the object at more than a predetermined surface thickness distance from the surface point,
   using the maximum value if the particular voxel node represents a position internal to the surface of the object at more than the predetermined surface thickness distance from the surface point, and
   using a value greater than the minimum value and less than the maximum value if the particular voxel node represents a position of the surface point or a position external or internal to the surface of the object at less than the predetermined surface thickness distance from the surface point.

4. The method of claim 2, wherein the determining of the confidence field value is based on a noise-reduction factor that is associated with the particular voxel node and an additional voxel node corresponding to an additional surface point on the surface of the object.

5. The method of claim 4, wherein the determining of the confidence field value based on the noise-reduction factor includes:
   determining a first intermediate confidence field value that accounts for a first distance factor that is associated with the particular voxel node and the surface point;
   determining a second intermediate confidence field value that accounts for a second distance factor that is associated with the additional voxel node and the additional surface point; and
   defining the confidence field value to be between the first and second intermediate confidence field values.

6. The method of claim 1, wherein the determining of the confidence field value is based on an agreement factor determined based on a mutuality of detection of the surface point by a plurality of capture devices that capture the color and depth data from the plurality of different vantage points.

7. The method of claim 1, wherein the generating of the reconstructed color and depth data includes performing a raytracing technique to determine the reconstructed color and depth data by:
- traversing, in a manner simulating a light ray traveling toward the surface point, a set of voxel nodes corresponding to the surface point; and
- determining the reconstructed color and depth data based on a position of a particular voxel node traversed within the set of voxel nodes, the particular voxel node including a confidence field value that satisfies a predetermined threshold that is not satisfied by other confidence field values associated with other voxel nodes traversed prior to the particular voxel node.

8. The method of claim 1, further comprising:
- storing, by the computing system within a particular voxel node allocated within a voxel data store, the confidence field value associated with the surface point; and
- accessing, by the computing system from the particular voxel node allocated within the voxel data store, the confidence field value stored within the particular voxel node;
- wherein the generating of the reconstructed color and depth data for the volumetric reconstruction of the surface of the object is based on the accessed confidence field value that is stored within the particular voxel node.

9. The method of claim 1, wherein:
- the object is located within a real-world capture space; and
- the color and depth data captured from the plurality of different vantage points is captured by a plurality of different capture devices located with the object within the real-world capture space.

10. The method of claim 9, wherein:
- the plurality of different vantage points includes a first vantage point within the real-world capture space and from which the surface point is visible on the surface of the object;
- the plurality of different vantage points further includes a second vantage point within the real-world capture space and from which the surface point is also visible on the surface of the object; and
- the plurality of different capture devices includes a first capture device that captures color and depth data from the first vantage point and a second capture device that captures color and depth data from the second vantage point.

11. A system comprising:
- a memory storing instructions; and
- a processor communicatively coupled to the memory and configured to execute the instructions to:
  - access color and depth data captured from a plurality of different vantage points for a surface point on a surface of an object;
  - determine, based on the color and depth data captured from the plurality of different vantage points, a confidence field value associated with the surface point; and
  - generate, based on the confidence field value associated with the surface point, reconstructed color and depth data for a volumetric reconstruction of the surface of the object.

12. The system of claim 11, wherein:
- the processor is further configured to execute the instructions to allocate, within a voxel data store, a set of voxel nodes corresponding to the surface point; and
- the confidence field value associated with the surface point is stored within a particular voxel node of the set of voxel nodes corresponding to the surface point.

13. The system of claim 12, wherein:
- the confidence field value is implemented as a numerical value between a minimum value and a maximum value greater than the minimum value; and
- the determining of the confidence field value is based on a distance factor associated with the surface point and the particular voxel node and includes:
  - using the minimum value if the particular voxel node represents a position external to the surface of the object at more than a predetermined surface thickness distance from the surface point,
  - using the maximum value if the particular voxel node represents a position internal to the surface of the object at more than the predetermined surface thickness distance from the surface point, and
  - using a value greater than the minimum value and less than the maximum value if the particular voxel node represents a position of the surface point or a position external or internal to the surface of the object at less than the predetermined surface thickness distance from the surface point.

14. The system of claim 12, wherein the determining of the confidence field value is based on a noise-reduction factor that is associated with the particular voxel node and an additional voxel node corresponding to an additional surface point on the surface of the object.

15. The system of claim 14, wherein the determining of the confidence field value based on the noise-reduction factor includes:
- determining a first intermediate confidence field value that accounts for a first distance factor that is associated with the particular voxel node and the surface point;
- determining a second intermediate confidence field value that accounts for a second distance factor that is associated with the additional voxel node and the additional surface point; and
- defining the confidence field value to be between the first and second intermediate confidence field values.

16. The system of claim 11, wherein the determining of the confidence field value is based on an agreement factor determined based on a mutuality of detection of the surface point by a plurality of capture devices that capture the color and depth data from the plurality of different vantage points.

17. The system of claim 11, wherein the generating of the reconstructed color and depth data includes performing a raytracing technique to determine the reconstructed color and depth data by:
- traversing, in a manner simulating a light ray traveling toward the surface point, a set of voxel nodes corresponding to the surface point; and
- determining the reconstructed color and depth data based on a position of a particular voxel node traversed within the set of voxel nodes, the particular voxel node including a confidence field value that satisfies a predetermined threshold that is not satisfied by other confidence field values associated with other voxel nodes traversed prior to the particular voxel node.

18. The system of claim 11, wherein:
- the processor is further configured to execute the instructions to:
  - store, within a particular voxel node allocated within a voxel data store, the confidence field value associated with the surface point, and access, from the particular voxel node allocated within the voxel data store, the confidence field value stored within the particular voxel node; and the generating of the reconstructed color and depth data for the volumetric reconstruction of the surface of the object is based on the accessed confidence field value that is stored within the particular voxel node.

19. The system of claim 11, wherein:

the object is located within a real-world capture space;

the plurality of different vantage points includes a first vantage point within the real-world capture space and from which the surface point is visible on the surface of the object;

the plurality of different vantage points further includes a second vantage point within the real-world capture space and from which the surface point is also visible on the surface of the object; and the color and depth data captured from the plurality of different vantage points is captured by a plurality of different capture devices located with the object within the real-world capture space, the plurality of different capture devices including a first capture device that captures color and depth data from the first vantage point and a second capture device that captures color and depth data from the second vantage point.

20. A non-transitory computer-readable medium storing instructions that, when executed, direct a processor of a computing device to:

access color and depth data captured from a plurality of different vantage points for a surface point on a surface of an object;

determine, based on the color and depth data captured from the plurality of different vantage points, a confidence field value associated with the surface point; and generate, based on the confidence field value associated with the surface point, reconstructed color and depth data for a volumetric reconstruction of the surface of the object.

* * * * *